US011131365B2

(12) United States Patent
Yamagishi et al.

(10) Patent No.: US 11,131,365 B2
(45) Date of Patent: Sep. 28, 2021

(54) REDUCER

(71) Applicants: Kanzaki Kokyukoki Manufacturing Co., Ltd., Hyogo (JP); YANMAR CO., LTD., Osaka (JP)

(72) Inventors: Noriyuki Yamagishi, Hyogo (JP); Koji Kiyooka, Hyogo (JP)

(73) Assignees: KANZAKI KOKYUKOKI MFG. CO., LTD., Hyogo (JP); YANMAR CO., LTD., Osaka (JP)

( * ) Notice: Subject to any disclaimer, the term of this patent is extended or adjusted under 35 U.S.C. 154(b) by 13 days.

(21) Appl. No.: 16/353,217

(22) Filed: Mar. 14, 2019

(65) Prior Publication Data

US 2019/0285144 A1    Sep. 19, 2019

(30) Foreign Application Priority Data

Mar. 14, 2018  (JP) .............................. JP2018046658
Mar. 14, 2018  (JP) .............................. JP2018046659

(51) Int. Cl.
*F16H 1/46*      (2006.01)
*F16H 57/02*     (2012.01)
(Continued)

(52) U.S. Cl.
CPC ............. *F16H 1/46* (2013.01); *B60K 7/0007* (2013.01); *B60K 17/046* (2013.01); *F16H 57/02* (2013.01);
(Continued)

(58) Field of Classification Search
CPC .. F16H 1/46; F16H 57/02; F16H 2057/02034; B60K 7/0007; B60K 17/046; B60K 7/00
See application file for complete search history.

(56) References Cited

U.S. PATENT DOCUMENTS

| 4,116,293 A  * | 9/1978 | Fukui .................. B62D 55/125 |
|                |        | 180/255 |
| 2002/0034998 A1 * | 3/2002 | Tsunemi .............. B60K 17/046 |
|                |        | 475/83 |

(Continued)

FOREIGN PATENT DOCUMENTS

| JP | H04165146 A | 6/1992 |
| JP | 2002147545 A | 5/2002 |

(Continued)

OTHER PUBLICATIONS

Machine translation of JPH04165146A filed Sep. 13, 2020. (Year: 2020).*

*Primary Examiner* — Tisha D Lewis
(74) *Attorney, Agent, or Firm* — Cantor Colburn LLP

(57) ABSTRACT

A reducer includes a fixed housing, a rotation housing, and multi-stage planetary gear mechanisms. The fixed housing contains a motor in the fixed housing. The rotation housing is rotatably supported by the fixed housing via a bearing at an outer surface of a one-end wall of the fixed housing. The multi-stage planetary gear mechanisms are configured to decelerate a rotation of the motor and transmit the rotation that has been decelerated to the rotation housing. The multi-stage planetary gear mechanisms include a final-stage planetary gear mechanism located at a downstream position in a direction in which motive power is transmitted. The final-stage planetary gear mechanism include a planetary gear rotatably supported by a planetary gear shaft that is supported at one end of the planetary gear shaft by the one-end wall of the fixed housing.

6 Claims, 14 Drawing Sheets

(51) Int. Cl.
    *B60K 7/00*          (2006.01)
    *H02K 7/116*       (2006.01)
    *B60K 17/04*      (2006.01)

(52) U.S. Cl.
    CPC .... *H02K 7/116* (2013.01); *F16H 2057/02034* (2013.01)

(56) References Cited

U.S. PATENT DOCUMENTS

| | | |
|---|---|---|
| 2014/0135166 A1 | 5/2014 | Wang et al. |
| 2015/0072821 A1* | 3/2015 | Grimm ............ F16H 1/46 475/31 |
| 2015/0377323 A1* | 12/2015 | Koike ............ F16H 57/0006 475/149 |

FOREIGN PATENT DOCUMENTS

| | | |
|---|---|---|
| JP | 2004232556 A | 8/2004 |
| JP | 2006038133 A | 2/2006 |
| JP | 2014156711 A | 8/2014 |
| JP | 2018046658 A | 3/2018 |
| JP | 2018046659 A | 3/2018 |

* cited by examiner

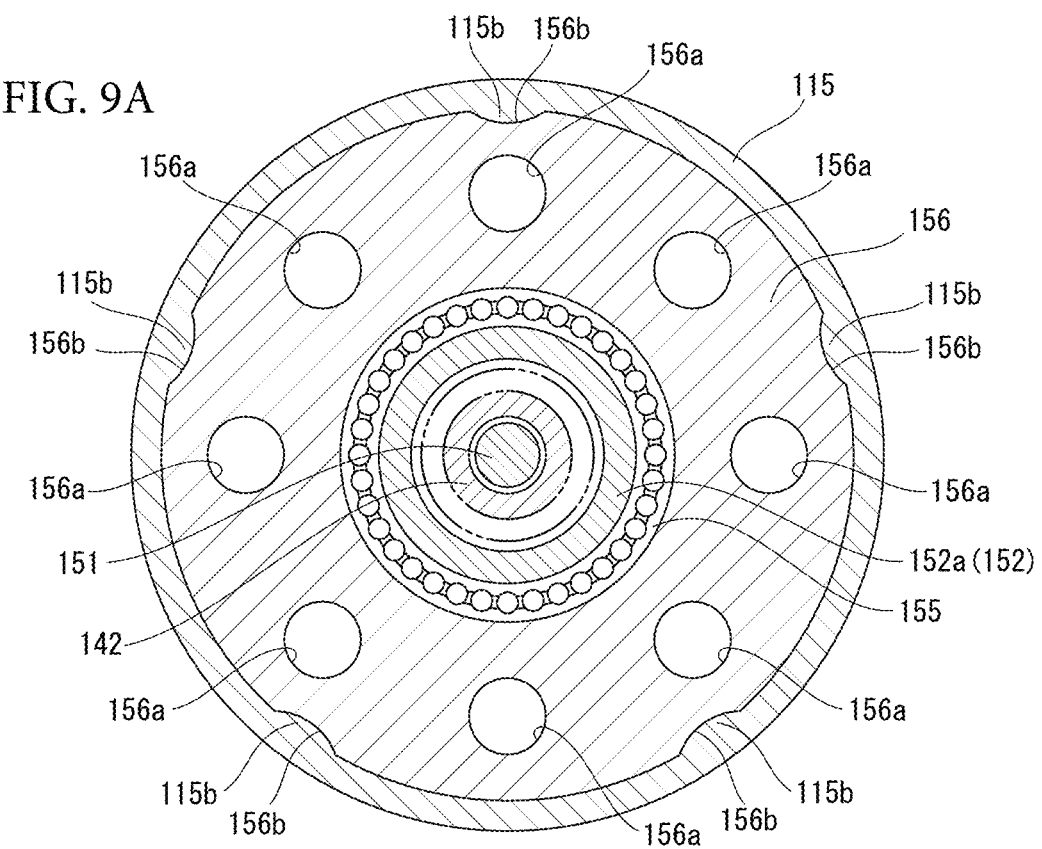
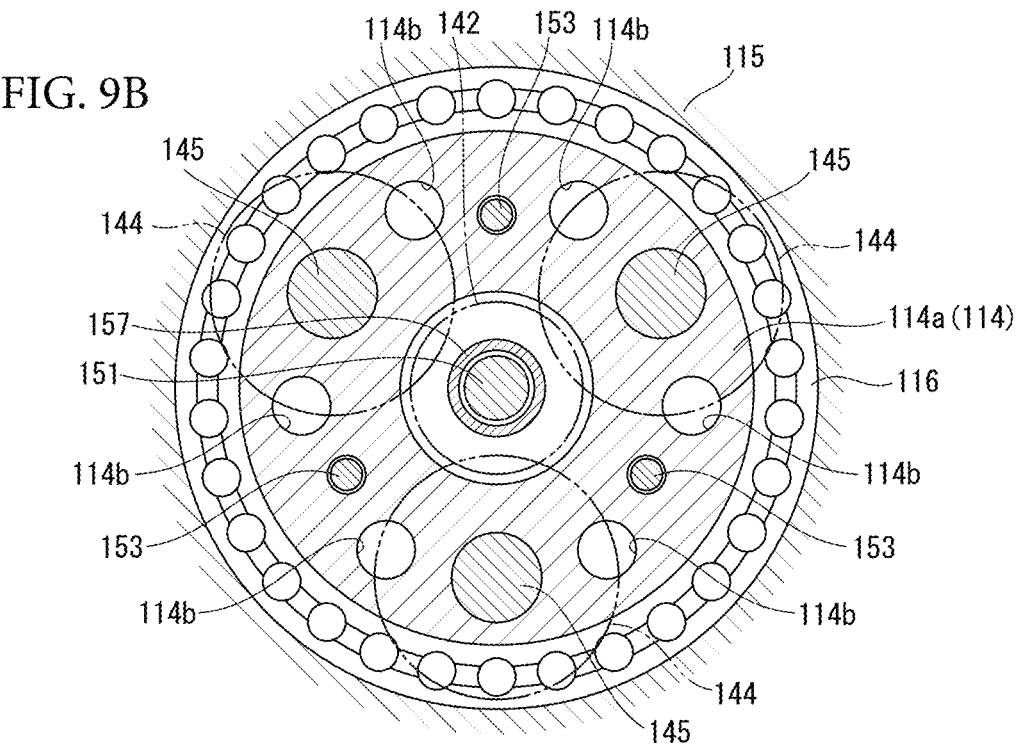

REDUCER

CROSS-REFERENCE TO RELATED APPLICATIONS

The present application claims priority under 35 U.S.C. § 119 to Japanese Patent Application No. 2018-46658 and No. 2018-46659, both filed on Mar. 14, 2018. The contents of these applications are incorporated herein by reference in their entirety.

BACKGROUND OF THE INVENTION

Field of the Invention

The present invention relates to a reducer including multi-stage planetary gear mechanisms.

Discussion of the Background

Conventionally, crawler tracks are used on vehicles for stable travel purposes in off-road environments such as on soft or weak grounds and sloping land. A crawler track is made up of a drive wheel, an idler wheel, and an endless crawler looped across the drive wheel and the idler wheel. It is common practice to use in such crawler track a reducer including multi-stage planetary gear mechanisms (see, for example, JP 4-165146 A).

In recent years, there has been a trend toward battery-powered driving and/or hybrid driving not only of automobiles but also forklift trucks, agricultural machinery, and heavy equipment such as backhoes. Then, for widespread use of battery-powered driving of machinery, there is a need for a compact, highly efficient reducer of a high reduction ratio.

While reducers including multi-stage planetary gear mechanisms are capable of realizing high reduction ratios, there has been such a problem that the multi-stage planetary gear mechanisms are arranged in the direction of the rotation axis of a reducer, making the reducer have a long profile in the axial direction of the reducer. If a reducer long in its axial direction is arranged in a crawler loop or a tire loop, the reducer may protrude beyond the crawler width or tire width, making the reducer liable to collision with objects.

It is an object of the present invention to provide a reducer improved in light of the above-described circumstances.

SUMMARY OF THE INVENTION

According to one aspect of the present invention, a reducer includes a fixed housing, a rotation housing, and multi-stage planetary gear mechanisms. The fixed housing contains a motor in the fixed housing. The rotation housing is rotatably supported by the fixed housing via a bearing at an outer surface of a one-end wall of the fixed housing. The multi-stage planetary gear mechanisms are configured to decelerate a rotation of the motor and transmit the rotation that has been decelerated to the rotation housing. The multi-stage planetary gear mechanisms include a final-stage planetary gear mechanism located at a downstream position in a direction in which motive power is transmitted. The final-stage planetary gear mechanism include a planetary gear rotatably supported by a planetary gear shaft that is supported at one end of the planetary gear shaft by the one-end wall of the fixed housing.

According to another aspect of the present invention, a reducer includes a fixed housing, a rotation housing, and multi-stage planetary gear mechanisms. The fixed housing contains a motor in the fixed housing. The rotation housing is rotatably supported by the fixed housing via a bearing at an outer surface of a one-end wall of the fixed housing. The multi-stage planetary gear mechanisms are configured to decelerate a rotation of the motor and transmit the rotation that has been decelerated to the rotation housing. A bearing support member is disposed on the one-end wall of the fixed housing. The rotation housing is rotatably supported by a first bearing and a second bearing. The first bearing serves as the bearing. The second bearing has a smaller bearing smaller in size than the first bearing and is located on the bearing support member. The multi-stage planetary gear mechanisms are aligned in series in the direction in which the motive power is transmitted. The planetary gear of the final-stage planetary gear mechanism is located between the one-end wall and the bearing support member. At one end of the planetary gear shaft, the planetary gear shaft is supported by the one-end wall, and at another end of the planetary gear shaft, the planetary gear shaft is supported by the bearing support member.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 9A is a cross-sectional view of the reducer taken along the line VIIIA-VIIIA illustrated in FIG. 8;

FIG. 9B is a cross-sectional view of the reducer taken along the line VIIIB-VIIIB illustrated in FIG. 8;

DESCRIPTION OF THE EMBODIMENTS

Figure 1:
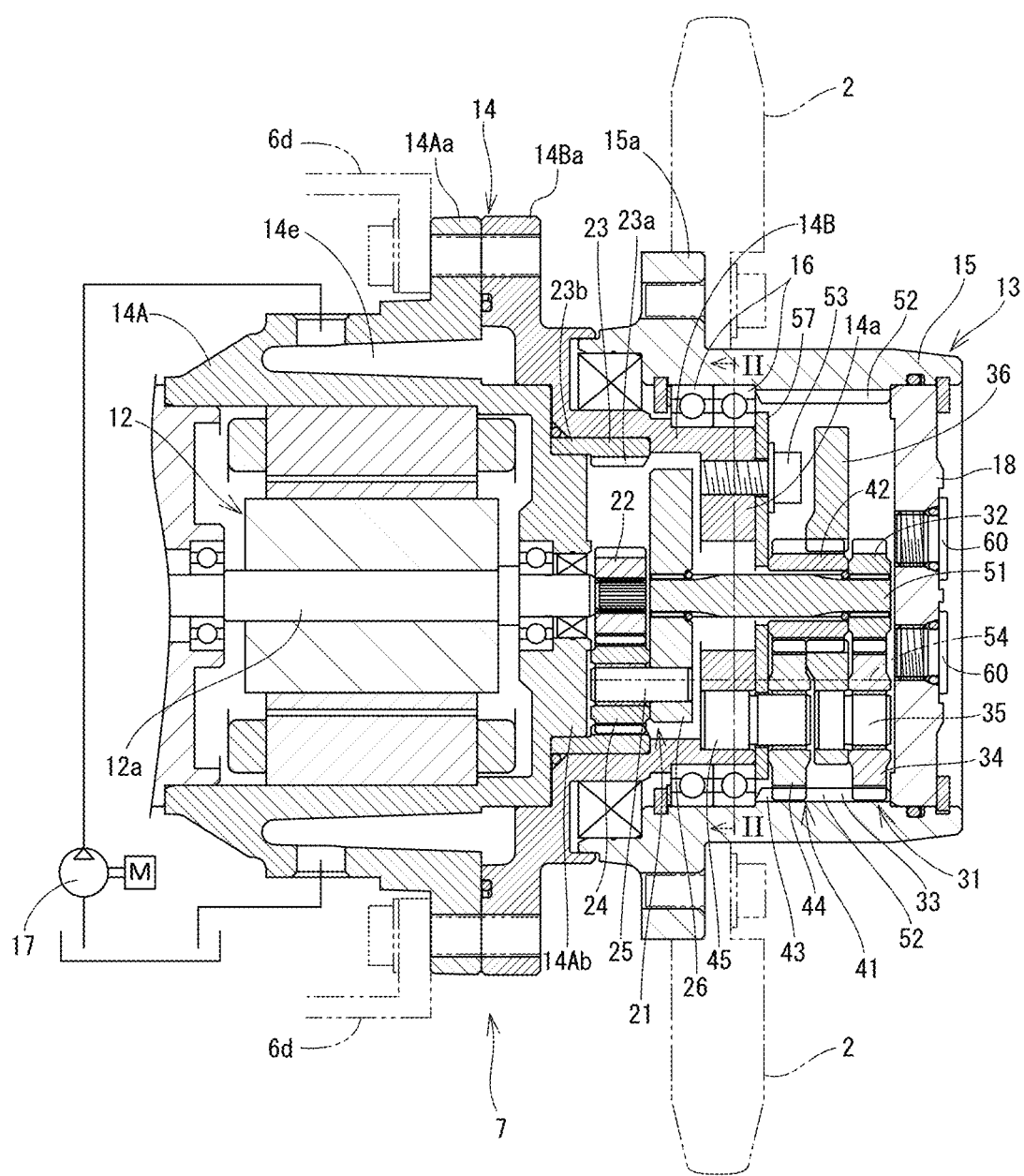
FIG. 1 is a sectional view of a reducer according to a first embodiment.

The embodiments will now be described with reference to the accompanying drawings, wherein like reference numerals designate corresponding or identical elements throughout the various drawings. In the following embodiments, the reducer according to the first embodiment of the present invention is applied to drivers of crawler tracks.

As illustrated in FIG. 1, a driver 7 includes a motor 12 and a reducer 13. In this embodiment, the motor 12 is an electric motor and located in a fixed housing 14 of the reducer 13. It is to be noted that the motor will not be limited to an electric motor but may be a hydraulic motor.

The reducer 13 includes the fixed housing 14, a rotation housing 15, and multi-stage planetary gear mechanisms 21, 31, and 41. The fixed housing 14 contains the motor 12. The rotation housing 15 is rotatably supported by the fixed housing 14 via a bearing 16 at the outer surface of a one-end wall 14a of the fixed housing 14. The multi-stage planetary gear mechanisms 21, 31, and 41 decelerate the rotation of the motor 12 and transmit the rotation that has been decelerated to the rotation housing 15. In this embodiment, the first-stage planetary gear mechanism 21, the second-stage planetary gear mechanism 31, and the third-stage (final-stage) planetary gear mechanism 41 are arranged in this order from upstream to downstream in the direction in which motive power is transmitted, that is, from a motor output shaft 12a of the motor 12 toward the rotation housing 15.

The output of the motor 12 is transmitted from the motor output shaft 12a to the first-stage to third-stage planetary gear mechanisms 21, 31, and 41 in this order. Through the first-stage to third-stage planetary gear mechanisms 21, 31, and 41, the output of the motor 12 is decelerated and increased in torque, and the resulting output drives the crawler (not illustrated) via the rotation housing 15 and the drive wheel 2. It is to be noted that the drive wheel 2 is mounted on the outer surface of the rotation housing 15, which has an approximately cylindrical shape, via an attachment flange 15a.

The fixed housing 14 includes a motor housing 14A and a gear housing 14B. The motor housing 14A contains the motor 12 and rotatably supports the motor output shaft 12a. The gear housing 14B contains the first-stage planetary gear mechanism 21. The motor housing 14A and the gear housing 14B each have: a cylindrical shape of aluminum alloy with a bottom integral to the cylindrical shape; and one-end wall that seals one end of the cylindrical shape. The gear housing 14B is mounted on a one-end wall 14Ab of the motor housing 14A. A one-end wall of the gear housing 14B constitutes the one-end wall 14a of the fixed housing 14.

A cooling water conduit 14e runs through the circumferential wall of the fixed housing 14. Through the cooling water conduit 14e, cooling water is caused to flow by a cooling water pump 17. In the motor housing 14A, an inverter and related devices (not illustrated) to control the driving of the motor 12 are contained at a position opposite to the one-end wall 14Ab across the motor 12.

A flange 14Aa is mounted on the outer surface of the motor housing 14A, and a flange 14Ba is mounted on the outer surface of the gear housing 14B. The flange 14Aa and the flange 14Ba are located at butting positions and connected to each other by bolts. That is, the motor housing 14A and the gear housing 14B are detachably connected to each other. Also, a driver support frame 6d is jointed to the flanges 14Aa and 14Ba by the bolts. The driver support frame 6d is equipment of the vehicle and located on the side of the flange 14Aa.

The first-stage planetary gear mechanism 21, which is located in the gear housing 14B, includes a sun gear 22, an internal gear member 23, three planetary gears 24, three planetary gear shafts 25, and a carrier 26. The sun gear 22 is connected to and unrotatable relative to the leading end of the motor output shaft 12a. The internal gear member 23 includes an internal gear 23a. The three planetary gears 24 are located between the sun gear 22 and the internal gear 23a. The three planetary gear shafts 25 rotatably support the planetary gears 24. The carrier 26 supports one end of each planetary gear shaft 25. The sun gear 22, the internal gear 23a, and the planetary gears 24 are spiral gears.

The internal gear member 23 is made of a material (for example, iron system material) having a thermal expansion coefficient smaller than the thermal expansion coefficient of the material (for example, aluminum alloy) of the motor housing 14A. The internal gear member 23 also includes an annular boss 23b. On the inner surface of the boss 23b, no internal gear 23a is formed. The boss 23b is fitted with the outer surface of the one-end wall 14Ab of the motor housing 14A by, for example, shrink fitting and thus is fixed to and unrotatable relative to the outer surface of the one-end wall 14Ab.

One end of a transmission axis 51 is connected to and unrotatable relative to the inner surface of the carrier 26. The transmission axis 51 extends in the rotation axis direction. A sun gear 32 of the second-stage planetary gear mechanism 31, which is located in the rotation housing 15, is connected to and unrotatable relative to the other end of the transmission axis 51.

In the rotation housing 15, the second-stage planetary gear mechanism 31 and the third-stage planetary gear mechanism 41 are located. One end (the end opposite to the fixed housing 14) of the approximately cylindrical shape of the rotation housing 15 is sealed by a lid 18. The lid 18 has a plurality of oil inlets formed through the lid 18. Through the oil inlets, lubricant is supplied into the rotation housing 15. On each of the oil inlets, an oiling nut 60 is mounted.

The second-stage planetary gear mechanism 31 includes the sun gear 32, an internal gear 33, three planetary gears 34, three planetary gear shafts 35, and a carrier 36. The sun gear 32 is connected to and unrotatable relative to one end of the transmission axis 51. The internal gear 33 is integral to the inner surface of the rotation housing 15. The three planetary gears 34 are located between the sun gear 32 and the internal gear 33. The three planetary gear shafts 35 rotatably support the planetary gears 34. The carrier 36 supports one end of each planetary gear shaft 35. The sun gear 32, the internal gear 33, and the planetary gears 34 are spur gears. A sun gear 42 of the third-stage planetary gear mechanism 41 is connected to and unrotatable relative to the inner surface of the carrier 36.

The third-stage planetary gear mechanism 41 includes the sun gear 42, an internal gear 43, three planetary gears 44, and three planetary gear shafts 45. The sun gear 42 is loosely fitted with the transmission axis 51 in a rotatable manner at a position closer to the fixed housing 14 than the sun gear 32 is to the fixed housing 14. The internal gear 43 is integral to the inner surface of the rotation housing 15. The three planetary gears 44 are located between the sun gear 42 and the internal gear 43. The three planetary gear shafts 45 rotatably support the planetary gears 44. The sun gear 42, the internal gear 43, and the planetary gears 44 are spur gears. At one ends of the planetary gear shafts 45, the planetary gear shafts 45 are supported by the one-end wall 14a of the fixed housing 14 (the gear housing 14B). The third-stage planetary gear mechanism 41 is not provided with a rotatable carrier. That is, the planetary gears 44 is not orbitally rotatable.

The internal gear 33 of the second-stage planetary gear mechanism 31 and the internal gear 43 of the third-stage planetary gear mechanism 41 are connected to each other in the rotation axis direction. That is, the internal gears 33 and 43 constitute a common internal gear 52. The common internal gear 52 is integral to the inner surface of the rotation housing 15, which has an approximately cylindrical shape, and has a width in the rotation axis direction.

A bearing pressing plate 57 is fixed to the one-end wall 14a of the fixed housing 14 by a plurality of bolts 53. The bearing pressing plate 57 restricts the movement of the bearing 16 in the rotation axis direction. The planetary gear shafts 45, which are supported at one ends by the one-end wall 14a, penetrate the bearing pressing plate 57.

Figure 2:
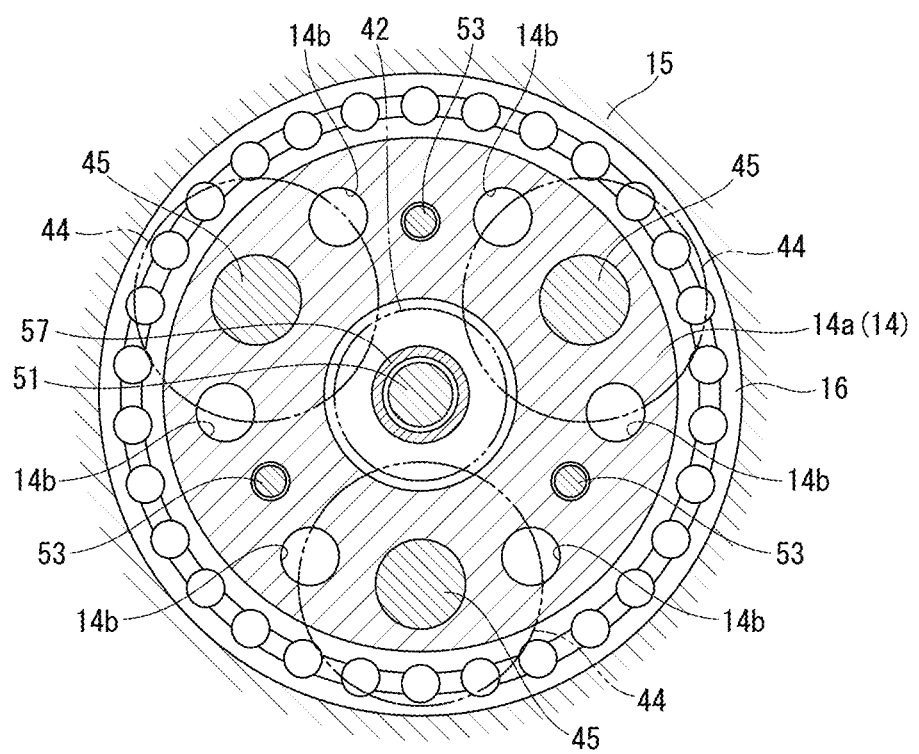
FIG. 2 is a cross-sectional view of the reducer taken along the line II-II illustrated in FIG. 1.

As illustrated in FIG. 2, a plurality of oil apertures 14b penetrate the one-end wall 14a in the rotation axis direction. There are also oil apertures, not illustrated, penetrating the bearing pressing plate 57 in the rotation axis direction at positions overlapping the oil apertures 14b in the rotation axis direction.

In the gear housing 14B and the rotation housing 15, lubricant is contained. In this embodiment, the planetary gear mechanisms 21, 31, and 41 are lubricated by splash lubrication. The oil surface, 54, of the lubricant is set at such a height that a cylindrical bush located between the planetary gear 24 and the planetary gear shaft 25 is immersed in the lubricant. The lubricant is distributable between the inside of the gear housing 14B and the inside of the rotation housing 15 through the oil apertures.

When the motor 12 is driven causing the motor output shaft 12a and the sun gear 22 of the first-stage planetary gear mechanism 21 to rotate, the planetary gear 24, which is meshed with both the sun gear 22 and the internal gear 23a, makes orbital rotation while rotating about itself between the sun gear 22 and the internal gear 23a. The orbital rotation of the planetary gear 24 causes the carrier 26 to rotate. The rotation of the carrier 26 is transmitted, via the transmission axis 51, to the sun gear 32 of the second-stage planetary gear mechanism 31, which is located in the rotation housing 15.

Upon rotation of the sun gear 32, the planetary gear 34, which is meshed with both the sun gear 32 and the internal gear 33, makes orbital rotation while rotating about itself between the sun gear 32 and the internal gear 33. The orbital rotation of the planetary gear 34 is transmitted, via the carrier 36, to the sun gear 42 of the third-stage planetary gear mechanism 41.

Upon rotation of the sun gear 42, the planetary gear 44, which is meshed with both the sun gear 42 and the internal gear 43, rotates about itself between the sun gear 42 and the internal gear 43, causing the rotation housing 15 to rotate. The rotation housing 15 that is rotating causes the drive wheel 2 to rotate, driving the crawler (not illustrated).

The reducer 13 according to this embodiment includes the fixed housing 14, the rotation housing 15, and the multi-stage planetary gear mechanisms 21, 31, and 41. The fixed housing 14 contains the motor 12. The rotation housing 15 is rotatably supported by the fixed housing 14 via the bearing 16 at the outer surface of the one-end wall 14a. The multi-stage planetary gear mechanisms 21, 31, and 41 decelerate the rotation of the motor 12 and transmit the rotation that has been decelerated to the rotation housing 15. Among the multi-stage planetary gear mechanisms 21, 31, and 41, the third-stage (final-stage) planetary gear mechanism 41 is located at a downstream position in the direction in which motive power is transmitted. In the third-stage planetary gear mechanism 41, the planetary gear shafts 45, which rotatably support the planetary gears 44, are supported at one ends by the one-end wall 14a of the fixed housing 14. This configuration ensures that the carrier of the third-stage planetary gear mechanism 41 can be implemented by the one-end wall 14a of the fixed housing 14, and that the thickness of the carrier in the rotation axis direction (thickness of the one-end wall 14a of the fixed housing 14) can be made smaller than when the planetary gear shafts 45 are supported at both ends. This configuration shortens the length of the reducer 13 in the rotation axis direction, realizing a compact configuration of the reducer 13. Also, the one-end wall 14a, which supports the planetary gear shafts 45, is integral to the fixed housing 14 (gear housing). This configuration makes it easier to provide rigidity to the fixed housing 14 and reduces the piece-part count of the reducer 13.

Also, the planetary gear shafts 25, which rotatably support the planetary gears 24 of the first-stage planetary gear mechanism 21, are supported at one ends by the carrier 26, and the planetary gear shafts 35, which rotatably support the planetary gears 34 of the second-stage planetary gear mechanism 31, are supported at one ends by the carrier 26. This configuration ensures that the thicknesses of the carriers 26 and 36 in the rotation axis direction can be made smaller than when the planetary gear shafts 25 and 35 are supported at both ends. This configuration shortens the length of the reducer 13 in the rotation axis direction, realizing a compact configuration of the reducer 13.

Also, among the multi-stage planetary gear mechanisms 21, 31, and 41 of the reducer 13, the first-stage planetary gear mechanism 21 is located at an upstream position in the direction in which motive power is transmitted. The gears 22, 23a, and 24 of the first-stage planetary gear mechanism 21 are spiral gears, and the gears 32, 33, 34, 42, 43, 44 of the second-stage planetary gear mechanism 31 and the third-stage planetary gear mechanism 41 are spur gears. This configuration ensures that the spiral gear configuration of the sun gear 22 reduces noise and vibration involved in the first-stage planetary gear mechanism 21, which rotates at 10000 rpm (rotations per minute) or higher, while motive power is transmitted by the spur gears of the second-stage planetary gear mechanism 31 and the third-stage planetary gear mechanism 41, which rotate less rapidly. This configuration realizes high transmission efficiency and a reduction in cost.

Also in the reducer 13, the rotation housing 15 has an approximately cylindrical shape, and the common internal gear 52, which has a width in the rotation axis direction, is integrally formed on the inner surface of the rotation housing 15. Among the multi-stage planetary gear mechanisms 21, 31, and 41, the third-stage (final-stage) planetary gear mechanism 41 and the second-stage planetary gear mechanism 31 respectively include the planetary gears 44 and 34 (the second-stage planetary gear mechanism 31 is located at an upper-stream position that is one stage upper than the final-stage planetary gear mechanism 41 in the direction in which motive power is transmitted). The planetary gears 44 and 34 are meshed with the common internal gear 52. The configuration in which the common internal gear 52 is formed on the inner surface of the rotation housing 15 reduces the piece-part count of the reducer 13, reduces the assembly process step count of the reducer 13, and reduces the production cost of the reducer 13.

Also in the reducer 13, the fixed housing 14 includes the motor housing 14A and the gear housing 14B detachably connected to each other. The motor housing 14A rotatably supports the motor output shaft 12a of the motor 12. The gear housing 14B contains the first-stage planetary gear mechanism 21, which is located at an upstream position in the direction in which motive power is transmitted. The gear housing 14B also constitutes the one-end wall 14a. The configuration in which the first-stage planetary gear mechanism 21 is contained in the gear housing 14B of the fixed housing 14 reduces the number of planetary gear mechanisms contained in the rotation housing 15, and shortens the length of the rotation housing 15 in the rotation axis direction. Also, the configuration in which the motor housing 14A and the gear housing 14B are detachable from each other improves the machinability of the motor housing 14A and the gear housing 14B. Also, the first-stage planetary gear mechanism 21 can be mounted or removed relative to the reducer 13 with the motor 12 contained in the motor housing 14A. This configuration improves the assemblability and dis-assemblability (maintainability) of the reducer 13.

Also, the boss 23b of the internal gear member 23, which includes the internal gear 23a of the first-stage planetary gear mechanism 21, is fitted with the outer surface of the motor housing 14A so that the boss 23b is fixed to and unrotatable relative to the outer surface of the motor housing 14A. This configuration ensures that the internal gear member 23 can be fixed in advance to the outer surface of the motor housing 14A by, for example, shrink fitting or another fastening method, resulting in improved assemblability of the reducer 13.

Further, the internal gear member 23 is made of a material (for example, iron system material) having a thermal expansion coefficient smaller than the thermal expansion coefficient of the material (for example, aluminum alloy) of the motor housing 14A. This configuration ensures that even if the temperature of the reducer 13 has increased while the reducer 13 is in motion, the internal gear member 23 is kept in fixed and unrotatable state relative to the motor housing 14A. This configuration, in turn, eliminates or minimizes failures associated with the reducer 13, such as transmission failure.

Next, by referring to FIG. 3, a reducer according to the second embodiment will be described. Like reference numerals designate corresponding or identical elements throughout FIG. 1 and FIG. 3.

In the reducer 13 according to the second embodiment, the internal gear member 23 of the first-stage planetary gear mechanism 21 includes an internal gear 23a on the inner surface of the internal gear member 23. The internal gear 23a extends between one end and the other end of the inner surface of the internal gear member 23 in the cylindrical shaft direction. That is, the internal gear 23a is elongated from the position opposed to the planetary gear 24 to the inner surface of the boss 23b. The portion of the internal gear 23a located at the inner surface of the boss 23b is meshed with fixed external teeth 14Ac. The fixed external teeth 14Ac are formed on the outer surface of the one-end wall 14Ab of the motor housing 14A. This configuration increases the reliability with which the internal gear member 23 is kept unrotatable relative to the motor housing 14A.

The reducer 13 according to the second embodiment is otherwise similar in configuration to the reducer 13 according to the first embodiment. Specifically, the reducer 13 according to the second embodiment provides operations and advantageous effects similar to the operations and advantageous effects provided by the reducer 13 according to the first embodiment. Further, the reducer 13 according to the second embodiment more reliably prevents the rotation of the internal gear member 23 relative to the motor housing 14A.

Next, by referring to FIG. 4, a reducer according to the third embodiment will be described. Like reference numerals designate corresponding or identical elements throughout FIG. 1 and FIG. 4.

In the reducer 13 according to the third embodiment, the internal gear member 23 of the first-stage planetary gear mechanism 21, which is contained in the gear housing 14B, is not provided with the boss 23b (see FIG. 1), and thus is not fitted with the outer surface of the one-end wall 14Ab of the motor housing 14A. The internal gear member 23 has an approximately cylindrical shape with the internal gear 23a formed on the inner surface of the internal gear member 23.

The internal gear member 23 abuts on an end surface of the one-end wall 14Ab. On the outer surface of the internal gear member 23, a cutout groove 23c is formed and extends in the rotation axis direction. Also, on the end surface of the one-end wall 14Ab of the motor housing 14A, an engagement pin member 55 is formed in a protruding manner. The engagement pin member 55 is engaged with the cutout groove 23c to unrotatably hold the internal gear member 23. This configuration increases the reliability with which the internal gear member 23 is kept unrotatable relative to the motor housing 14A.

The reducer 13 according to the third embodiment is otherwise similar in configuration to the reducer 13 according to the first embodiment. Specifically, the reducer 13 according to the third embodiment provides operations and advantageous effects similar to the operations and advantageous effects provided by the reducer 113 according to the first embodiment except for the operations and advantageous effects associated with the configuration in which the boss 23b (see FIG. 1) of the internal gear member 23 is fitted with the outer surface of the one-end wall 14Ab.

Figure 5:
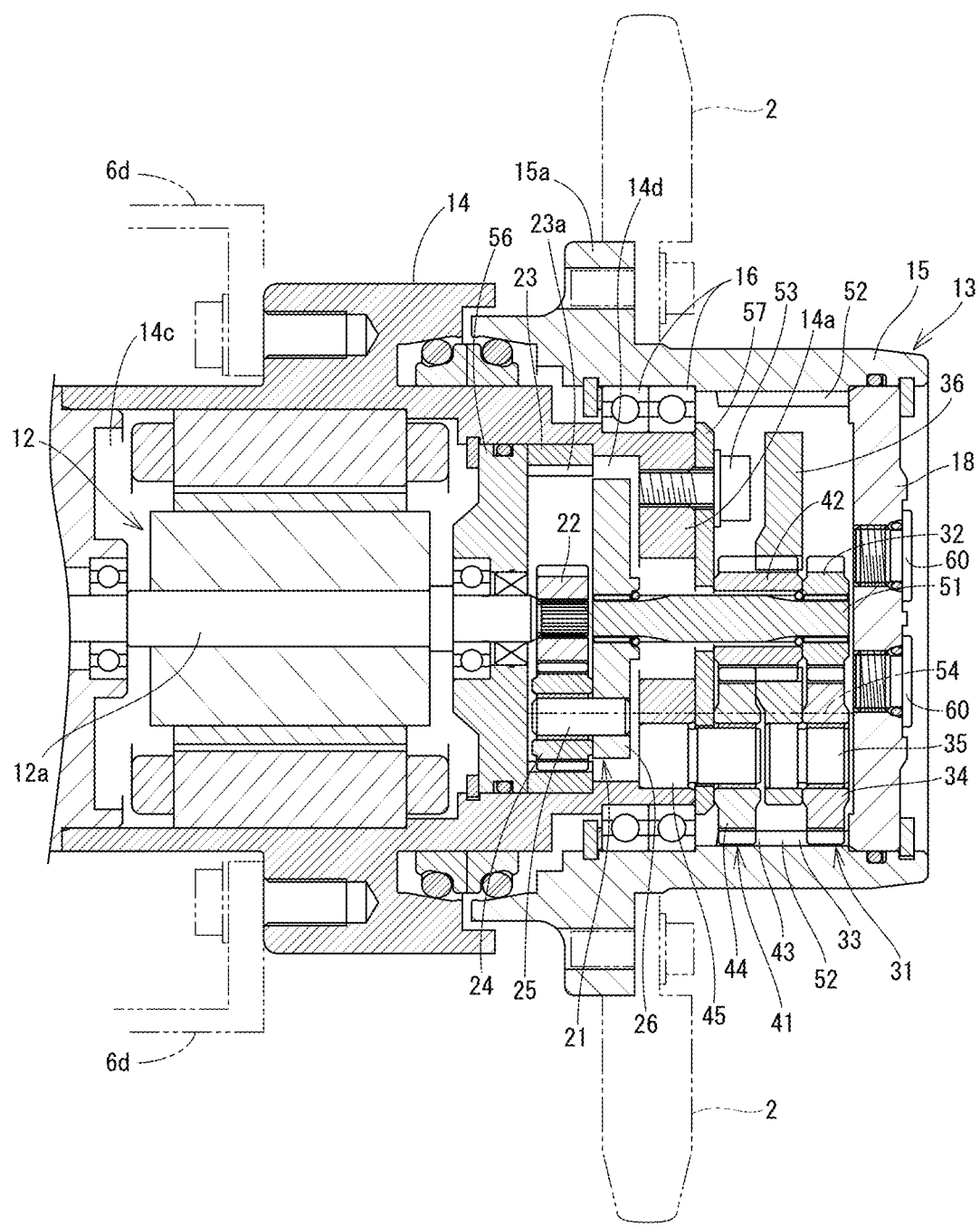
FIG. 5 is a sectional view of a reducer according to a fourth embodiment.

Next, by referring to FIG. 5, a reducer according to the fourth embodiment will be described. Like reference numerals designate corresponding or identical elements throughout FIG. 1 and FIG. 5.

In the reducer 13 according to the fourth embodiment, the fixed housing 14 is a cylindrical integral member that has a motor space 14c and a gear space 14d. In the motor space 14c, the motor 12 is contained. In the gear space 14d, the first-stage planetary gear mechanism 21 is contained. A cover member 56 is located in the fixed housing 14 to partition the motor space 14c and the gear space 14d from each other.

The internal gear member 23 of the first-stage planetary gear mechanism 21 is fixed to and unrotatable relative to the inner surface of the fixed housing 14 in the gear space 14d. Also, the sun gear 22-side end of the motor output shaft 12a is rotatably supported by the cover member 56.

The reducer 13 according to the fourth embodiment is otherwise similar in configuration to the reducer 13 according to the second embodiment. Specifically, the reducer 13 according to the fourth embodiment provides operations and advantageous effects similar to the operations and advantageous effects provided by the reducer 113 according to the first embodiment except for the operations and advantageous effects associated with the configuration in which the boss 23b of the internal gear member 23 is fitted with the outer surface of the one-end wall 14Ab (see FIG. 1) and the configuration in which the fixed housing 14 includes the motor housing 14A and the gear housing 14B (see FIG. 1).

Figure 6:
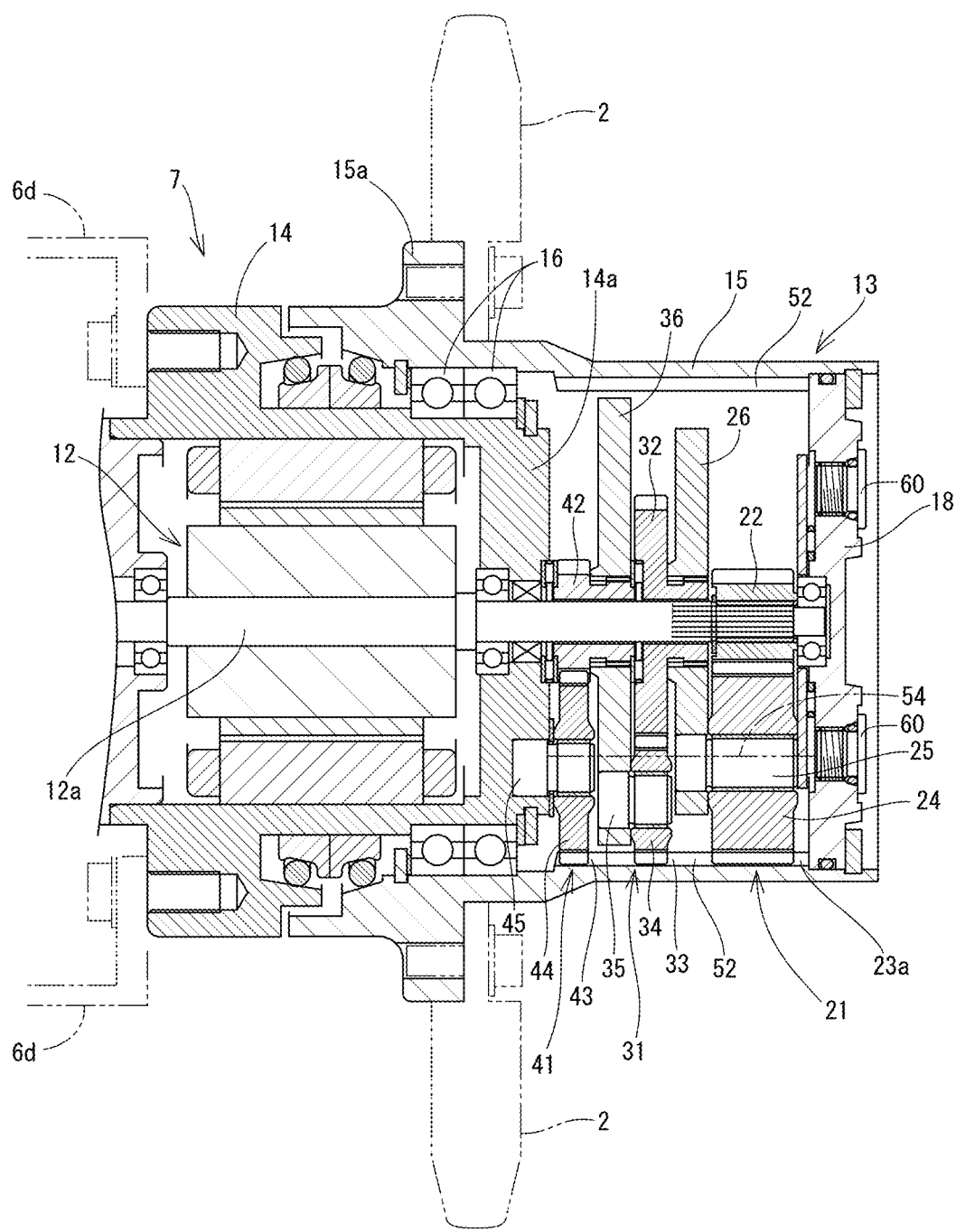
FIG. 6 is a sectional view of a reducer according to a fifth embodiment.

Next, by referring to FIG. 6, a reducer according to the fifth embodiment will be described. Like reference numerals designate corresponding or identical elements throughout FIG. 1 and FIG. 6.

In the reducer 13 according to the fifth embodiment, the first-stage planetary gear mechanism 21 is located in the rotation housing 15. In the fixed housing 14, the motor 12 is contained. The motor output shaft 12a is elongated from the inside of the fixed housing 14 to the inside of the rotation housing 15. An intermediate portion of the motor output shaft 12a is rotatably supported by the one-end wall 14a of the fixed housing 14. The leading end of the motor output shaft 12a is rotatably supported by the lid 18, which seals one end (the end opposite to the fixed housing 14) of the rotation housing 15.

In the rotation housing 15, the first-stage planetary gear mechanism 21, the second-stage planetary gear mechanism 31, and the third-stage planetary gear mechanism 41 are arranged in this order from the direction of the leading end of the motor output shaft 12a (from the direction of the lid 18 side). The output of the motor 12 is transmitted from the motor output shaft 12a to the first-stage to third-stage planetary gear mechanisms 21, 31, and 41 in this order. Through the first-stage to third-stage planetary gear mechanisms 21, 31, and 41, the output of the motor 12 is decelerated and increased in torque, and the resulting output drives the crawler (not illustrated) via the rotation housing 15 and the drive wheel 2.

The sun gear 22 of the first-stage planetary gear mechanism 21 is connected to and unrotatable relative to the leading end of the motor output shaft 12a. The internal gear 23a is integral to the inner surface of the rotation housing 15. Between the sun gear 22 and the internal gear 23a, three planetary gears 24 are located. The planetary gears 24 are rotatably supported by the three planetary gear shafts 25, which are supported at one ends by the carrier 26. The sun gear 32 of the second-stage planetary gear mechanism 31 is connected to and unrotatable relative to the inner surface of the carrier 26.

The sun gear 32 of the second-stage planetary gear mechanism 31 is loosely fitted with the motor output shaft 12a in a rotatable manner at a position closer to the fixed housing 14 than the sun gear 22 is to the fixed housing 14. The three planetary gears 34 are located between the sun gear 32 and the internal gear 33, which is integral to the inner surface of the rotation housing 15. The planetary gears 34 are rotatably supported by the three planetary gear shafts 35, which are supported at one ends by the carrier 36. The sun gear 42 of the third-stage planetary gear mechanism 41 is connected to and unrotatable relative to the inner surface of the carrier 36.

The sun gear 42 of the third-stage planetary gear mechanism 41 is loosely fitted with the motor output shaft 12a in a rotatable manner at a position closer to the fixed housing 14 than the sun gear 32 is to the fixed housing 14. The three planetary gears 44 are located between the sun gear 42 and the internal gear 43, which is integral to the inner surface of the rotation housing 15. The planetary gears 34 are rotatably supported by the planetary gear shafts 45, which are supported at one ends by the one-end wall 14a of the fixed housing 14. In this embodiment as well, the third-stage planetary gear mechanism 41 is not provided with a rotatable carrier. That is, the planetary gears 44 is not orbitally rotatable.

The internal gears 23a, 33, and 43 of the first to third-stage planetary gear mechanisms 21, 31, and 41 are connected to each other in the rotation axis direction. That is, the internal gears 23a, 33, and 43 constitute a common internal gear 52. The common internal gear 52 is integral to the inner surface of the rotation housing 15, which has an approximately cylindrical shape, and has a width in the rotation axis direction.

When the motor 12 is driven causing the motor output shaft 12a and the sun gear 22 of the first-stage planetary gear mechanism 21 to rotate, the planetary gear 24, which is meshed with both the sun gear 22 and the internal gear 23a, makes orbital rotation while rotating about itself between the sun gear 22 and the internal gear 23a. The orbital rotation of planetary gear 24 is transmitted, via the carrier 26, to the sun gear 32 of the second-stage planetary gear mechanism 31.

Upon rotation of the sun gear 32, the planetary gear 34, which is meshed with both the sun gear 32 and the internal gear 33, makes orbital rotation while rotating about itself between the sun gear 32 and the internal gear 33. The orbital rotation of the planetary gear 34 is transmitted, via the carrier 36, to the sun gear 42 of the third-stage planetary gear mechanism 41.

Upon rotation of the sun gear 42, the planetary gear 44, which is meshed with both the sun gear 42 and the internal gear 43, rotates about itself between the sun gear 42 and the internal gear 43, causing the rotation housing 15 to rotate. The rotation housing 15 that is rotating causes the drive wheel 2 to rotate, driving the crawler (not illustrated).

It is to be noted that in the reducer 13 according to the fifth embodiment, the gears 22, 23a, 24, 32, 33, 34, 42, 43, and 44 of the first to third-stage planetary gear mechanisms 21, 31, and 41 are spiral gears. This configuration reduces noise and vibration caused by driving of the first to third-stage planetary gear mechanisms 21, 31, and 41. It is to be noted, however, that in the reducer 13 according to the fifth embodiment, one or all of the first to third-stage planetary gear mechanisms 21, 31, and 41 may be a spur gear or spur gears.

As seen from FIG. 1 to FIG. 6, in the reducers 13 according to the first to fifth embodiments, the planetary gear shafts 45 of the third-stage planetary gear mechanism 41 are supported at one ends by the one-end wall 14a of the fixed housing 14. This configuration ensures that the carrier of the planetary gear mechanism 41 can be implemented by the one-end wall 14a, and that the thickness of the carrier in the rotation axis direction (thickness of the one-end wall 14a of the fixed housing 14) can be made smaller than when the planetary gear shafts 45 are supported at both ends. This configuration shortens the length of the reducer 13 in the rotation axis direction, realizing a compact configuration of the reducer 13.

Also, in the reducers 13 according to the first to fourth embodiments, the gears 22, 23a, and 24 of the first-stage planetary gear mechanism 21 are spiral gears, and the gears 32, 33, 34, 42, 43, and 44 of the second-stage planetary gear mechanism 31 and the third-stage planetary gear mechanism 41 are spur gears. The spiral gears reduce noise and vibration involved in the first-stage planetary gear mechanism 21, which rotates at high rpm, while motive power is transmitted by the spur gears of the second-stage planetary gear mechanism 31 and the third-stage planetary gear mechanism 41, which rotate less rapidly. This configuration realizes high transmission efficiency and a reduction in cost.

Also as seen from FIG. 1 to FIG. 6, in the reducers 13 according to the first to fifth embodiments, the planetary gear 34 of the second-stage planetary gear mechanism 31 and the planetary gear 44 of the third-stage planetary gear mechanism 41 are meshed with the common internal gear 52, which is integral to the inner surface of the rotation housing 15. This configuration reduces the piece-part count of the reducer 13, reduces the assembly process step count of the reducer 13, and reduces the production cost of the reducer 13. Also as seen from FIG. 6, in the reducer 13 according to the fifth embodiment, the planetary gears 24 of the first-stage planetary gear mechanism 21 are also meshed with the common internal gear 52. This configuration further reduces the piece-part count of the reducer 13, further reduces the assembly process step count of the reducer 13, and further reduces the production cost of the reducer 13.

Figure 3:
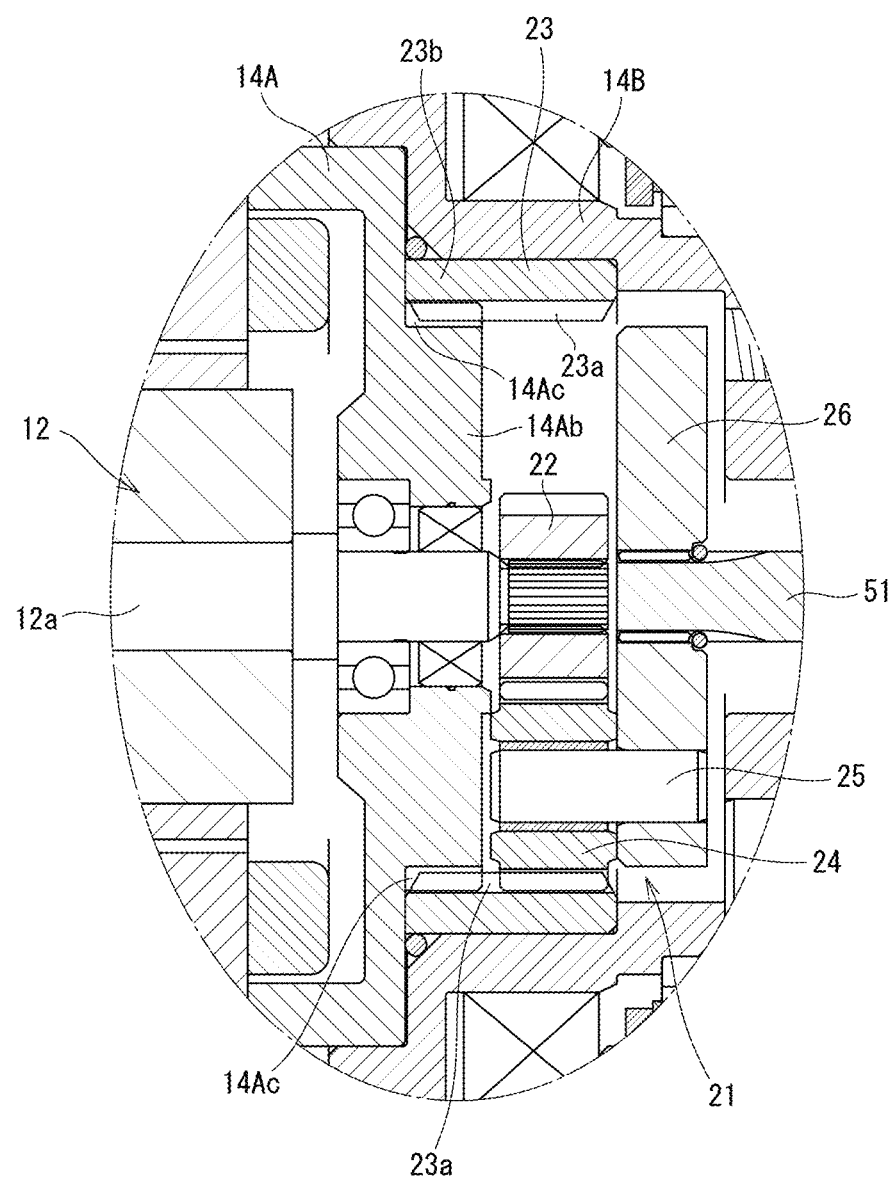
FIG. 3 is an enlarged cross-sectional view of a part of a reducer according to a second embodiment.
Figure 4:
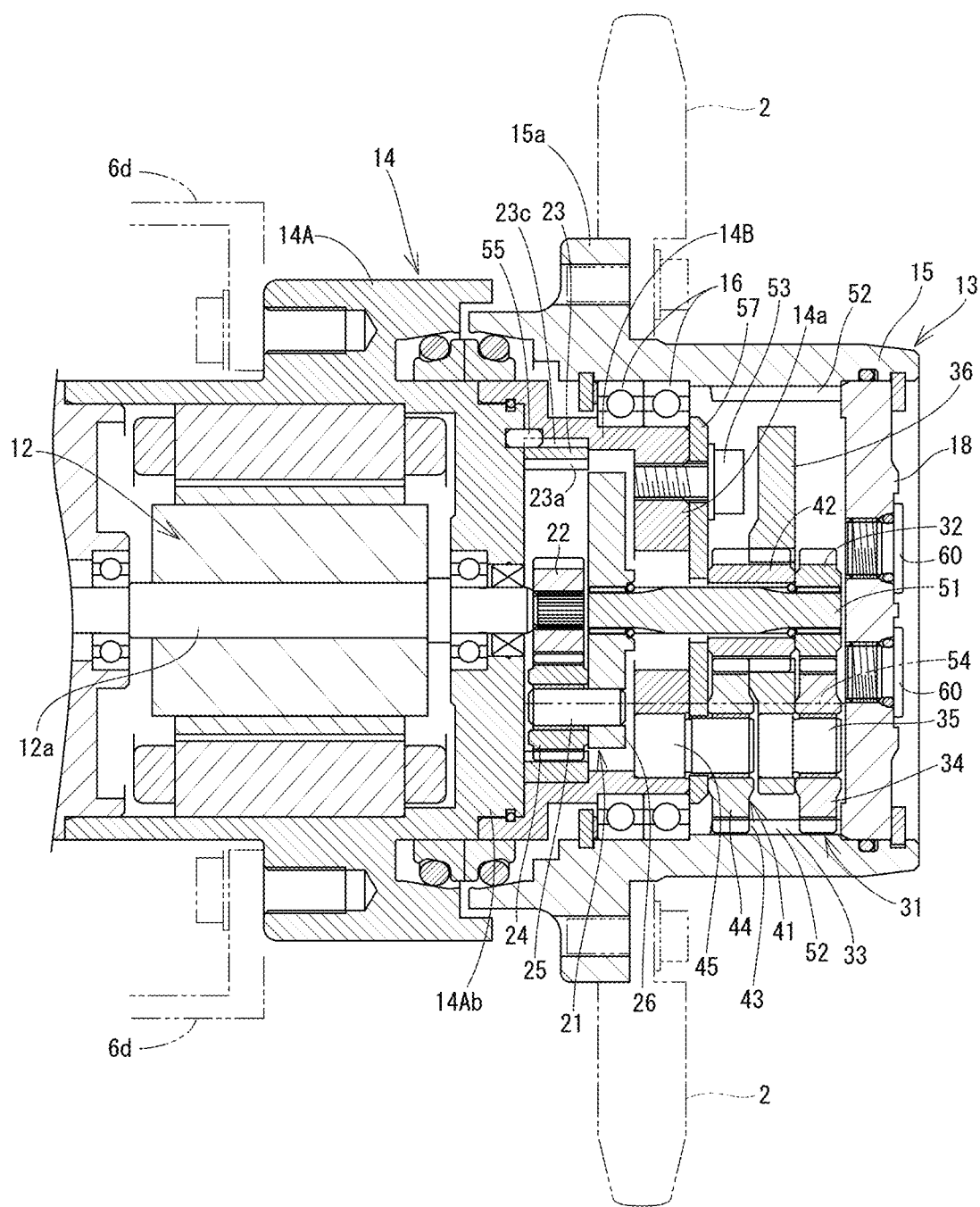
FIG. 4 is a sectional view of a reducer according to a third embodiment.

Also as seen from FIG. 1, FIG. 3, and FIG. 4, in the reducers 13 according to the first to third embodiments, the first-stage planetary gear mechanism 21 is contained in the gear housing 14B of the fixed housing 14. This configuration reduces the number of planetary gear mechanisms contained in the rotation housing 15, and shortens the length of the rotation housing 15 in the rotation axis direction. Also, the configuration in which the motor housing 14A and the gear housing 14B are detachable from each other improves the machinability of the motor housing 14A and the gear housing 14B. Also, the first-stage planetary gear mechanism 21 can be mounted or removed relative to the reducer 13 with the motor 12 contained in the motor housing 14A. This configuration improves the assemblability and dis-assemblability (maintainability) of the reducer 13.

Figure 7:
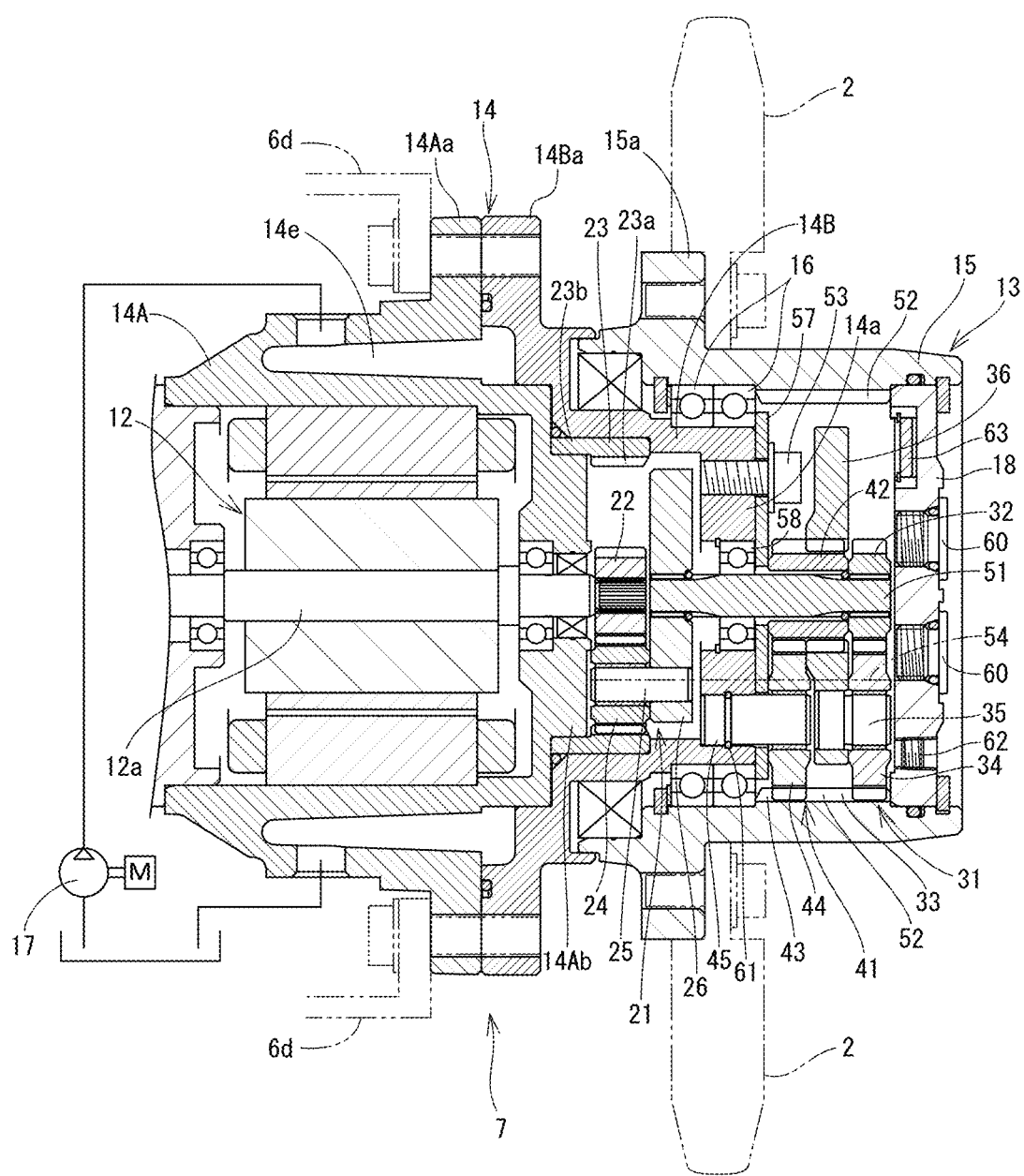
FIG. 7 is a sectional view of a reducer according to a sixth embodiment.

Next, by referring to FIG. 7, a reducer according to the sixth embodiment will be described. Like reference numerals designate corresponding or identical elements throughout FIG. 1 and FIG. 7.

In the reducer 13 according to the sixth embodiment, an intermediate portion of the transmission axis 51 is rotatably supported by the one-end wall 14a of the fixed housing 14 via a transmission axis bearing 58. This configuration eliminates or minimizes rotation-related wobbling of the transmission axis 51. Also, the planetary gear shafts 45, which are supported at one ends by the one-end wall 14a of the fixed housing 14, are unremovably fixed to the one-end wall 14a. The unremovable configuration is implemented by C-shaped retaining rings 61. Each of the retaining rings 61 is fitted with: a groove formed on the inner wall of a planetary gear shaft attachment hole formed on the one-end wall 14a; and a groove formed on a side surface of the planetary gear shaft 45.

An oil observation inlet is formed through the lid 18 and blocked by a detachable oil observation nut 62. Also, a depression is formed on the lid 18 at a position where the depression is immersed in the lubricant in the rotation housing 15. In the depression, an iron powder removal magnet 63 is located. The iron powder removal magnet 63 attracts and removes ferromagnetic substances, such as iron powder, thereby preventing ferromagnetic substances from contaminating the lubricant in the rotation housing 15.

The reducer 13 according to the sixth embodiment is otherwise similar in configuration to the reducer 13 according to the first embodiment. Specifically, the reducer 13 according to the sixth embodiment provides operations and advantageous effects similar to the operations and advantageous effects provided by the reducer 13 according to the first embodiment.

Incidentally, in the above-described reducer, a plurality of bearings are aligned in the rotation axis direction between the fixed housing and the rotation housing. These bearings are mounted on the outer surface of the fixed housing, which contains the motor. This configuration requires the plurality of bearings to be large in size, causing high production cost problems. The following embodiments provide reducers improved in light of the above-described circumstances.

By referring to FIG. 8, a reducer according to the seventh embodiment will be described. The following description is regarding a non-limiting example in which the reducer according to the seventh embodiment is applied to a driver of a crawler track.

Figure 8:
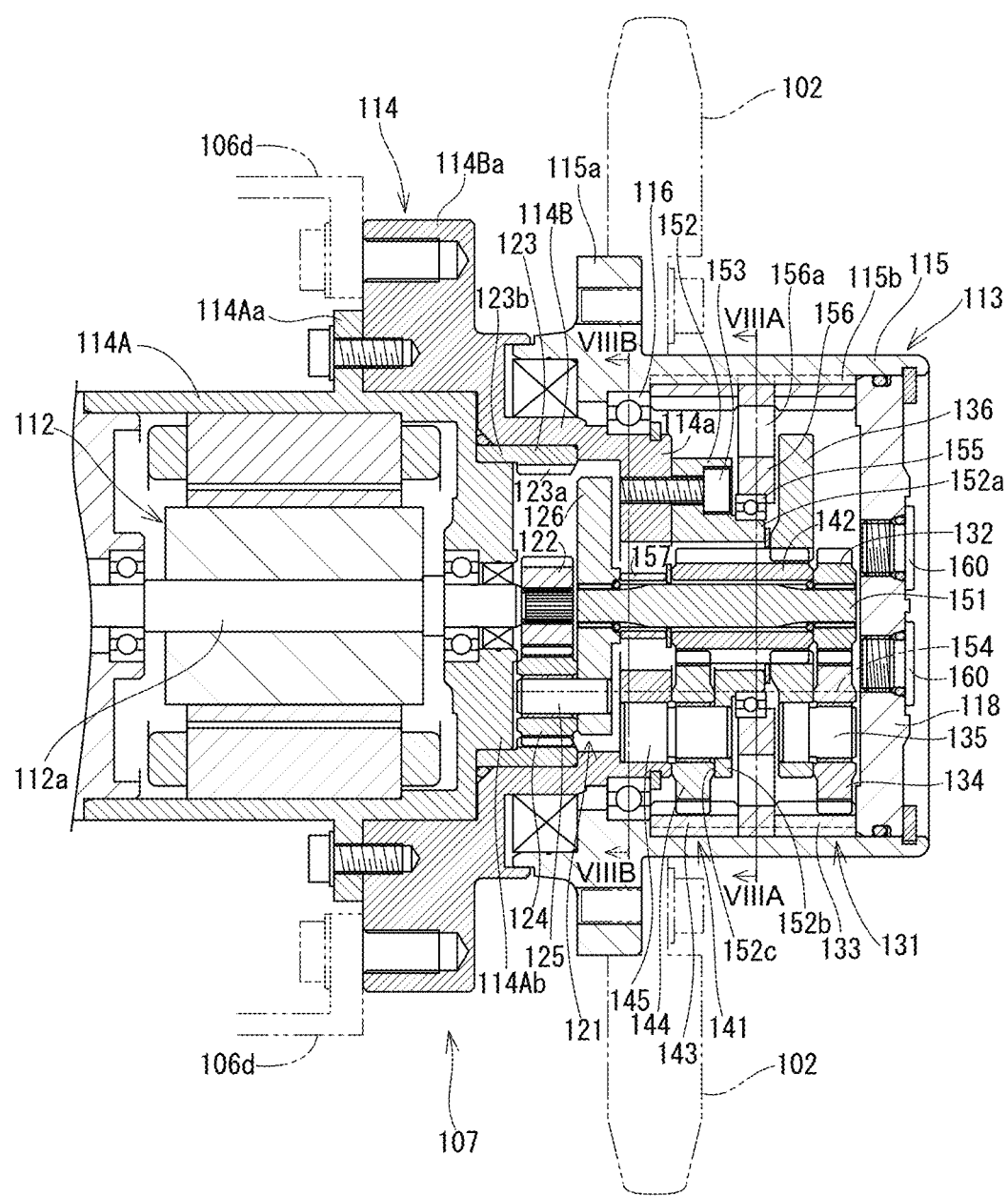
FIG. 8 is a sectional view of a reducer according to a seventh embodiment.

As illustrated in FIG. 8, a driver 107 includes a motor 112 and a reducer 113. In this embodiment, the motor 112 is an electric motor and located in a fixed housing 114 of the reducer 113. It is to be noted that the motor will not be limited to an electric motor but may be a hydraulic motor.

The reducer 113 includes the fixed housing 114, a rotation housing 115, and multi-stage planetary gear mechanisms 121, 131, and 141. The fixed housing 114 contains the motor 112. The rotation housing 115 is rotatably supported by, via the first bearing 116, the fixed housing 114 at its outer surface at the side of a one-end wall 114a of the fixed housing 114. The multi-stage planetary gear mechanisms 121, 131, and 141 decelerate the rotation of the motor 112 and transmit the rotation that has been decelerated to the rotation housing 115. The rotation housing 115 is also rotatably supported by a bearing support member 152 via a second bearing 155 and a bearing plate 156. The bearing support member 152 is mounted on the one-end wall 114a of the fixed housing 114.

The bearing support member 152 includes a bearing support 152a and a mounting portion 152b. The bearing support 152a has an approximately cylindrical shape and located at the end of the fixed housing 114 opposite to the one-end wall 114a of the fixed housing 114. The mounting portion 152b is larger in diameter than the bearing support 152a and located at the side of the one-end wall 114a. The mounting portion 152b is fixed to the one-end wall 114a of the fixed housing 114 by three bolts 153.

As illustrated in FIG. 9A as well, the second bearing 155 is mounted on the outer surface of the bearing support 152a. The second bearing 155 is a smaller bearing that is smaller in size than the first bearing 116. That is, the outer diameter of the second bearing 155 is smaller than the outer diameter of the first bearing 116.

The bearing plate 156 is located between the second bearing 155 and the inner wall of the rotation housing 115. The bearing plate 156 has an approximately circular shape and a through hole approximately in the center of the bearing plate 156. Through the bearing plate 156, a plurality of oil apertures 156a are formed. Through the plurality of oil apertures 156a, lubricant to be contained in the rotation housing 115 is distributable. Also, on the inner wall of the rotation housing 115, a plurality of protrusions 115b are formed. The plurality of protrusions 115b extend in the rotation axis direction. On the outer surface of the bearing plate 156, a plurality of depressions 156b are formed. The plurality of depressions 156b are located at positions corresponding to the plurality of protrusions 115b. With the protrusions 115b fitted in the depressions 156b, the bearing plate 156 is unrotatable relative to the rotation housing 115.

In this embodiment, the first-stage planetary gear mechanism 121, the second-stage planetary gear mechanism 131, and the third-stage (final-stage) planetary gear mechanism 141 are arranged in this order from upstream to downstream in the direction in which motive power is transmitted, that is, from a motor output shaft 112a of the motor 112 toward the rotation housing 115.

The output of the motor 112 is transmitted from the motor output shaft 112a to the first-stage to third-stage planetary gear mechanisms 121, 131, and 141 in this order. Through the first-stage to third-stage planetary gear mechanisms 121, 131, and 141, the output of the motor 112 is decelerated and increased in torque, and the resulting output drives the crawler (not illustrated) via the rotation housing 115 and a drive wheel 102. It is to be noted that the drive wheel 102 is mounted on an attachment flange 115a, which is mounted on the outer surface of the approximately cylindrical shape of the rotation housing 115.

The fixed housing 114 includes a motor housing 114A and a gear housing 114B. The motor housing 114A contains the motor 112 and rotatably supports the motor output shaft 112a. The gear housing 114B contains the first-stage planetary gear mechanism 121. The motor housing 114A and the gear housing 114B each have: a cylindrical shape of aluminum alloy with a bottom integral to the cylindrical shape; and one-end wall that seals one end of the cylindrical shape.

The gear housing 114B is mounted on a one-end wall 114Ab of the motor housing 114A. A one-end wall of the gear housing 114B constitutes the one-end wall 114a of the fixed housing 114. In the motor housing 114A, an inverter and related devices (not illustrated) to control the driving of the motor 112 are contained at a position opposite to the one-end wall 114Ab across the motor 112.

A flange 114Aa is mounted on the outer surface of the motor housing 114A, and a flange 114Ba is mounted on the outer surface of the gear housing 114B. The flange 114Aa and the flange 114Ba are located at butting positions and connected to each other by bolts. That is, the motor housing 114A and the gear housing 114B are detachably connected to each other. Also, a driver support frame 106d, which is equipment of the vehicle, is jointed to the flange 114Ba by the bolts.

The first-stage planetary gear mechanism 121, which is located in the gear housing 114B, includes a sun gear 122, an internal gear member 123, three planetary gears 124, three planetary gear shafts 125, and a carrier 126. The sun gear 122 is connected to and unrotatable relative to the leading end of the motor output shaft 12a. The internal gear member 123 includes an internal gear 123a. The three planetary gears 124 are located between the sun gear 122 and the internal gear 123a. The three planetary gear shafts 125 rotatably support the planetary gears 124. The carrier 126 supports one end of each planetary gear shaft 125. The sun gear 122, the internal gear 123a, and the planetary gears 124 are spiral gears.

The internal gear member 123 is made of a material (for example, iron system material) having a thermal expansion coefficient smaller than the thermal expansion coefficient of the material (for example, aluminum alloy) of the motor housing 114A. The internal gear member 123 also includes an annular boss 123b. On the inner surface of the boss 123b, no internal gear 123a is formed. The boss 123b is fitted with the outer surface of the one-end wall 114Ab of the motor housing 114A by, for example, shrink fitting and thus is fixed to and unrotatable relative to the outer surface of the one-end wall 114Ab.

One end of a transmission axis 151 is connected to and unrotatable relative to the inner surface of the carrier 126. The transmission axis 151 extends in the rotation axis direction. A sun gear 132 of the second-stage planetary gear mechanism 131, which is located in the rotation housing 115, is connected to and unrotatable relative to the other end of the transmission axis 151.

In the rotation housing 115, the second-stage planetary gear mechanism 131 and the third-stage planetary gear mechanism 141 are located. One end (the end opposite to the fixed housing 114) of the approximately cylindrical shape of the rotation housing 115 is sealed by a lid 118. The lid 118 has a plurality of oil inlets formed through the lid 118. Through the oil inlets, lubricant is supplied into the rotation housing 115. On each of the oil inlets, an oiling nut 160 is mounted.

The second-stage planetary gear mechanism 131 includes the sun gear 132, an internal gear 133, three planetary gears 134, three planetary gear shafts 135, and a carrier 136. The sun gear 132 is connected to and unrotatable relative to one end of the transmission axis 151. The internal gear 133 is integral to the inner surface of the rotation housing 115. The three planetary gears 134 are located between the sun gear 132 and the internal gear 133. The three planetary gear shafts 135 rotatably support the planetary gears 134. The carrier 136 supports one end of each planetary gear shaft 135. The sun gear 132, the internal gear 133, and the planetary gears 134 are spur gears. A sun gear 142 of the third-stage planetary gear mechanism 141 is connected to and unrotatable relative to the inner surface of the carrier 136.

The third-stage planetary gear mechanism 141 includes the sun gear 142, an internal gear 143, three planetary gears 144, and three planetary gear shafts 145. The sun gear 142 is loosely fitted with the transmission axis 151 in a rotatable manner at a position closer to the fixed housing 114 than the sun gear 132 is to the fixed housing 114. The internal gear 143 is integral to the inner surface of the rotation housing 115. The three planetary gears 144 are located between the sun gear 142 and the internal gear 143. The three planetary gear shafts 145 rotatably support the planetary gears 144. The sun gear 142, the internal gear 143, and the planetary gears 144 are spur gears.

The planetary gears 144 are located between the one-end wall 114a of the fixed housing 114 and the bearing support member 152. Specifically, the planetary gears 144 are located in gear receiving depressions 152c of the mounting portion 152b of the bearing support member 152. The gear receiving depressions 152c are open to the outer surface of the mounting portion 152b and to the joint surface of the one-end wall 114a at which the gear receiving depressions 152c meet the one-end wall 114a.

One end of each planetary gear shaft 145 is supported by the one-end wall 114a of the fixed housing 114 (the gear housing 114B). The other end of the planetary gear shaft 145 is supported by the mounting portion 152b of the bearing support member 152. Thus, the third-stage planetary gear mechanism 141 is not provided with a rotatable carrier. Specifically, the planetary gears 144 is not orbitally rotatable.

The internal gear 133 of the second-stage planetary gear mechanism 131 and the internal gear 143 of the third-stage planetary gear mechanism 141 are arranged side by side across the bearing plate 156. On the outer surfaces of the internally-toothed internal gears 133 and 143, depressions are formed for the protrusions 115b to be fitted in, similarly to the depressions 156b of the bearing plate 156. This configuration makes the internal gears 133 and 143 unrotatable relative to the rotation housing 115. It is to be noted that a cylindrical spacer member 157 is located between the sun gear 142 and the carrier 126 of the first-stage planetary gear mechanism 121. The spacer member 157 is mounted on the transmission axis 151.

In the gear housing 114B and the rotation housing 115, lubricant is contained. In this embodiment, the planetary gear mechanisms 121, 131, and 141 are lubricated by splash lubrication. The oil surface, 154, of the lubricant is set at such a height that a cylindrical bush located between the planetary gear 124 and the planetary gear shaft 125 is immersed in the lubricant.

As illustrated in FIG. 9B, a plurality of oil apertures 114b are formed through the one-end wall 114a of the fixed housing 114. The lubricant is distributable between the inside of the gear housing 114B and the inside of the rotation housing 115 through the oil apertures 114b.

When the motor 112 is driven causing the motor output shaft 112a and the sun gear 122 of the first-stage planetary gear mechanism 121 to rotate, the planetary gear 124, which is meshed with both the sun gear 122 and the internal gear 123a, makes orbital rotation while rotating about itself between the sun gear 122 and the internal gear 123a. The orbital rotation of the planetary gear 124 causes the carrier 126 to rotate. The rotation of the carrier 126 is transmitted, via the transmission axis 151, to the sun gear 132 of the second-stage planetary gear mechanism 131, which is located in the rotation housing 115.

Upon rotation of the sun gear 132, the planetary gear 134, which is meshed with both the sun gear 132 and the internal gear 133, makes orbital rotation while rotating about itself between the sun gear 132 and the internal gear 133. The orbital rotation of the planetary gear 134 is transmitted, via the carrier 136, to the sun gear 142 of the third-stage planetary gear mechanism 141.

Upon rotation of the sun gear 142, the planetary gear 144, which is meshed with both the sun gear 142 and the internal gear 143, rotates about itself between the sun gear 142 and the internal gear 143, causing the rotation housing 115 to rotate. The rotation housing 115 that is rotating causes the drive wheel 102 to rotate, driving the crawler (not illustrated).

The reducer 113 according to this embodiment includes the fixed housing 114, the rotation housing 115, and the planetary gear mechanisms 121, 131, and 141. The fixed housing 114 contains the motor 112. The rotation housing 115 is rotatably supported by the fixed housing 114 via the first bearing 116 at the outer surface of the one-end wall 114a. The multi-stage planetary gear mechanisms 121, 131, and 141 decelerate the rotation of the motor 112 and transmit the rotation that has been decelerated to the rotation housing 115. Also, the bearing support member 152 is mounted on the one-end wall 114a of the fixed housing 114. The rotation housing 115 is rotatably supported by the first bearing 116 and the second bearing 155. The first bearing 116 is located on the outer surface of the fixed housing 114. The second bearing 155 is a smaller bearing that is smaller in size than the first bearing 116, and is located on the bearing support member 152. Thus, the reducer 113 according to this embodiment uses the plurality of bearings 116 and 155 to prevent wobbling of the rotation axis of the rotation housing 115 while reducing the cost of using the plurality of bearings 116 and 155, resulting in a reduction in the production cost of the reducer 113.

Also, the planetary gear mechanisms used in the reducer 113 according to this embodiment are the multi-stage planetary gear mechanisms 121, 131, and 141. The multi-stage planetary gear mechanisms 121, 131, and 141 are aligned in series in the direction in which motive power is transmitted. Among the multi-stage planetary gear mechanisms 121, 131, and 141, the third-stage (final-stage) planetary gear mechanism 141 is located at a downstream position in the direction in which motive power is transmitted. In the third-stage planetary gear mechanism 141, the planetary gears 144 are located between the one-end wall 114a and the bearing support member 152. The planetary gear shafts 145, which rotatably support the planetary gears 144, are supported at one ends by the one-end wall 114a and are supported at the other ends by the bearing support member 152. Thus, the reducer 113 uses the one-end wall 114a of the fixed housing 114 and the bearing support member 152, which is located at the one-end wall 114a, to firmly fix both ends of each planetary gear shaft 145 of the third-stage planetary gear mechanism 141 without increasing the piece-part count of the reducer 113. Also, the one-end wall 114a, which supports the one end of the planetary gear shaft 145, is integral to the fixed housing 114 (the gear housing 114B). This configuration makes it easier to provide rigidity to the fixed housing 114 and reduces the piece-part count of the reducer 113.

Also in the reducer 113, among the multi-stage planetary gear mechanisms 121, 131, and 141, the first-stage planetary gear mechanism 121 is located at an upstream position in the direction in which motive power is transmitted. The gears 122, 123a, and 124 of the first-stage planetary gear mechanism 121 are spiral gears, and the gears 132, 133, 134, 142, 143, and 144 of the second-stage planetary gear mechanism 131 and the third-stage planetary gear mechanism 141 are spur gears. This configuration ensures that the spiral gear configuration of the sun gear 122 reduces noise and vibration involved in the first-stage planetary gear mechanism 121, which rotates at 10000 rpm (rotations per minute) or higher, while motive power is highly efficiently transmitted by the spur gears of the second-stage planetary gear mechanism 131 and the third-stage planetary gear mechanism 141, which rotate less rapidly. This configuration realizes high transmission efficiency and a reduction in cost.

Also in the reducer 113, the fixed housing 114 includes the motor housing 114A and the gear housing 114B detachably connected to each other. The motor housing 114A rotatably supports the motor output shaft 112a of the motor 112. The gear housing 114B contains the first-stage planetary gear mechanism 121, which is located at an upstream position in the direction in which motive power is transmitted. The gear housing 114B also constitutes the one-end wall 114a. The configuration in which the first-stage planetary gear mechanism 121 is contained in the gear housing 114B of the fixed housing 114 reduces the number of planetary gear mechanisms contained in the rotation housing 115, and shortens the length of the rotation housing 115 in the rotation axis direction. As a result, a compact configuration of the reducer 113 is realized. Also, the configuration in which the motor housing 114A and the gear housing 114B are detachable from each other improves the machinability of the motor housing 114A and the gear housing 114B. Also, the first-stage planetary gear mechanism 121 can be mounted or removed relative to the reducer 113 with the motor 112 contained in the motor housing 114A. This configuration improves the assemblability and dis-assemblability (maintainability) of the reducer 113.

Figure 10:
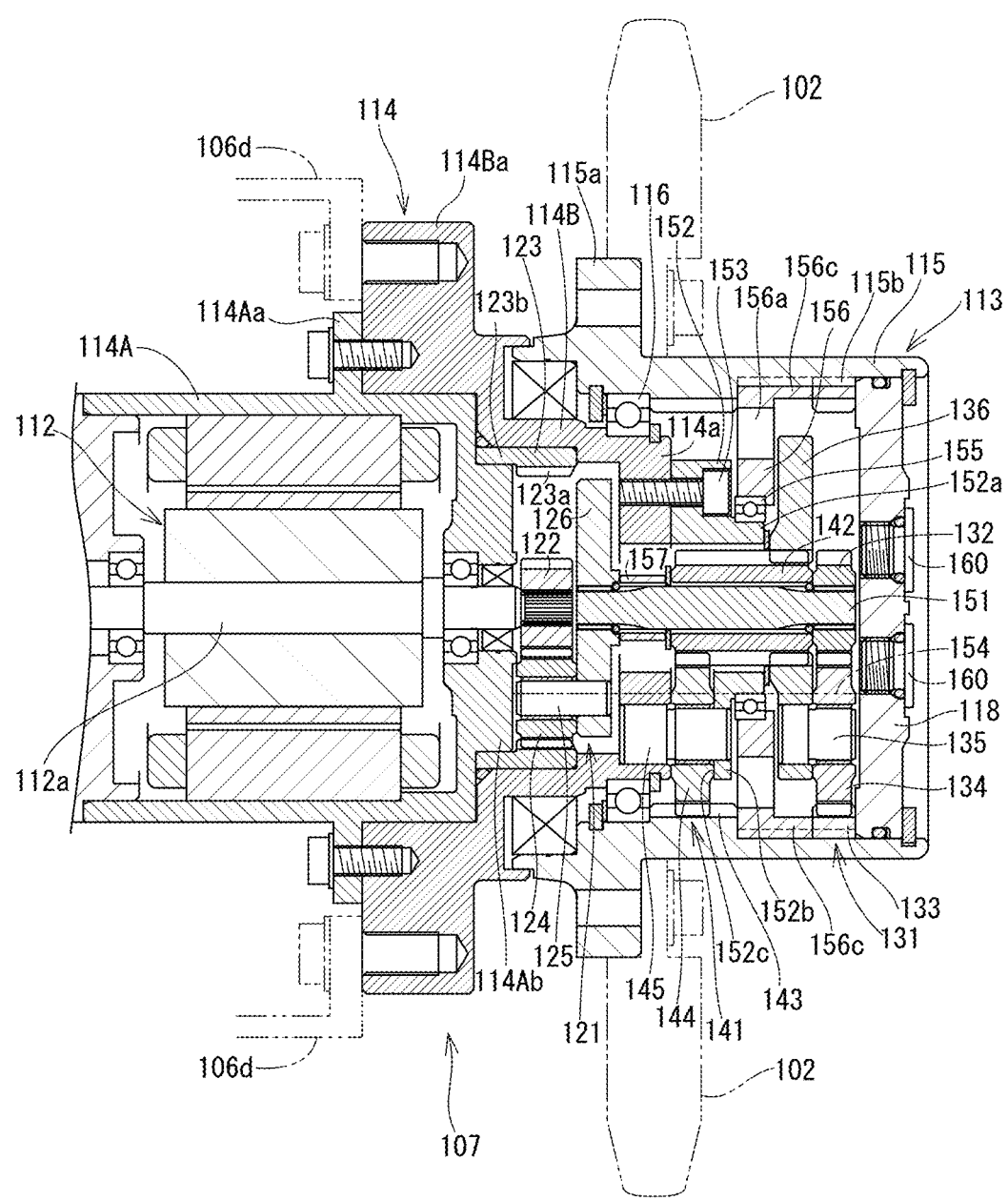
FIG. 10 is a sectional view of a reducer according to an eighth embodiment.

Next, by referring to FIG. 10, a reducer according to the eighth embodiment will be described. Like reference numerals designate corresponding or identical elements throughout FIG. 8 and FIG. 10.

In the reducer 113 according to the eighth embodiment, the internal gear 143 of the third-stage planetary gear mechanism 141, which is contained in the rotation housing 115, is integral to the inner wall of the rotation housing 115. This configuration increases the reliability with which the internal gear 143 is kept unrotatable relative to the rotation housing 115, eliminating or minimizing failures such as failed motive power transmission. The above configuration also reduces the piece-part count of the reducer 113, resulting in a reduction in the production cost of the reducer 113.

Also in the reducer 113 according to the eighth embodiment, the bearing plate 156 (which is located between the internal gear 133 and the internal gear 143 in the rotation housing 115) includes an annular rib 156c on a circumferential edge of the bearing plate 156. The rib 156c protrudes toward the internal gear 133. In the space defined by the rib 156c, the carrier 136 of the second-stage planetary gear mechanism 131 is located. This configuration enlarges the area of contact between the bearing plate 156 and the inner wall of the rotation housing 115 while securing enough space for the carrier 136. This increases the reliability with which wobbling of the rotation axis of the rotation housing 115 is prevented.

The reducer 113 according to the eighth embodiment is otherwise similar in configuration to the reducer 113 according to the seventh embodiment. Specifically, the reducer 113 according to the eighth embodiment provides operations and advantageous effects similar to the operations and advantageous effects provided by the reducer 113 according to the seventh embodiment.

Figure 11:
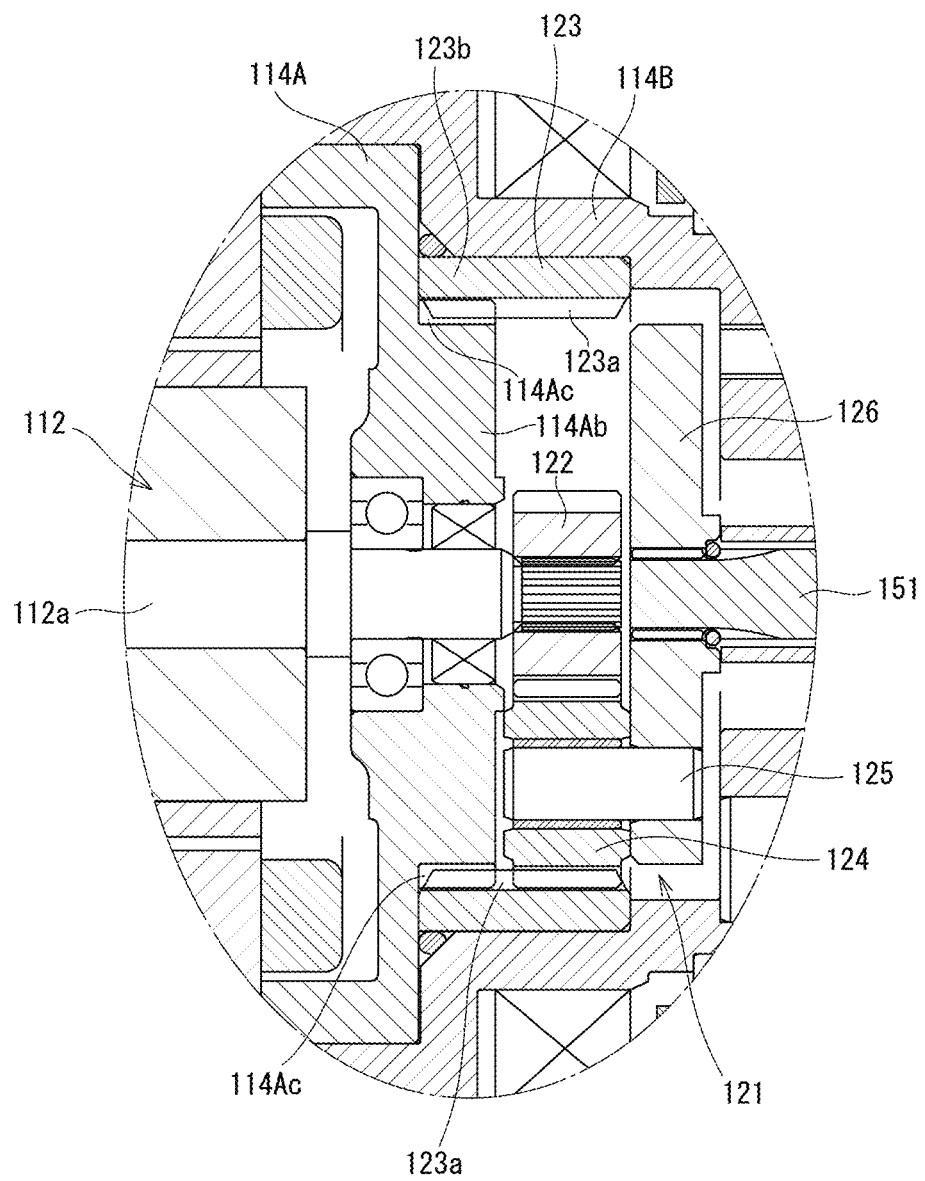
FIG. 11 is an enlarged cross-sectional view of a part of a reducer according to a ninth embodiment.

Next, by referring to FIG. 11, a reducer according to the ninth embodiment will be described. Like reference numerals designate corresponding or identical elements throughout FIG. 8 and FIG. 11.

In the reducer 113 according to the ninth embodiment, the first-stage planetary gear mechanism 121 includes an internal gear 123a on the inner surface of the internal gear member 123. The internal gear 123a extends between one end and the other end of the inner surface of the internal gear member 123 in the cylindrical shaft direction. That is, the internal gear 123a is elongated from the position opposed to the planetary gear 124 to the inner surface of the boss 123b. The portion of the internal gear 123a located at the inner surface of the boss 123b is meshed with fixed external teeth 114Ac. The fixed external teeth 114Ac are formed on the outer surface of the one-end wall 114Ab of the motor housing 114A. This configuration increases the reliability with which the internal gear member 123 is kept unrotatable relative to the motor housing 114A.

The reducer 113 according to the ninth embodiment is otherwise similar in configuration to the reducer 113 according to the seventh embodiment. Specifically, the reducer 113 according to the ninth embodiment provides operations and advantageous effects similar to the operations and advantageous effects provided by the reducer 113 according to the seventh embodiment. Further, the reducer 113 according to the ninth embodiment more reliably prevents the rotation of the internal gear member 123 relative to the motor housing 114A.

Figure 12:
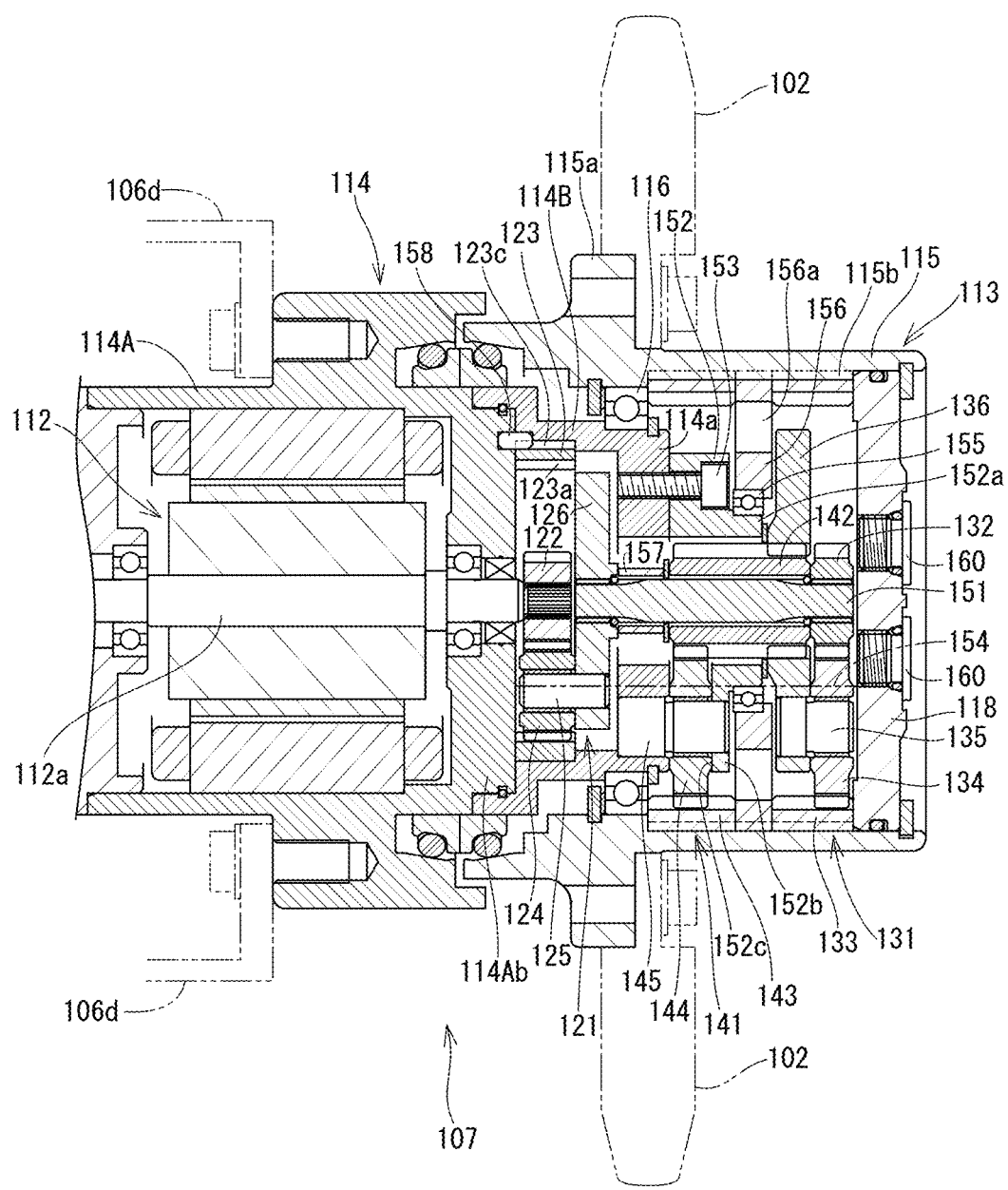
FIG. 12 is a sectional view of a reducer according to a tenth embodiment.

Next, by referring to FIG. 12, a reducer according to the tenth embodiment will be described. Like reference numerals designate corresponding or identical elements throughout FIG. 8 and FIG. 12.

In the reducer 113 according to the tenth embodiment, the internal gear member 123 of the first-stage planetary gear mechanism 121, which is contained in the gear housing 114B, is not provided with the boss 123b (see FIG. 8), and thus is not fitted with the outer surface of the one-end wall 114Ab of the motor housing 114A. The internal gear member 123 has an approximately cylindrical shape with the internal gear 123a formed on the inner surface of the internal gear member 123.

The internal gear member 123 abuts on an end surface of the one-end wall 114Ab. On the outer surface of the internal gear member 123, a cutout groove 123c is formed and extends in the rotation axis direction. Also, on the end surface of the one-end wall 114Ab of the motor housing 114A, an engagement pin member 158 is formed in a protruding manner. The engagement pin member 158 is engaged with the cutout groove 123c to unrotatably hold the internal gear member 123. This configuration increases the reliability with which the internal gear member 123 is kept unrotatable relative to the motor housing 114A.

The reducer 113 according to the tenth embodiment is otherwise similar in configuration to the reducer 113 according to the seventh embodiment. Specifically, the reducer 113 according to the tenth embodiment provides operations and advantageous effects similar to the operations and advantageous effects provided by the reducer 113 according to the seventh embodiment except for the operations and advantageous effects associated with the configuration in which the boss 123b (see FIG. 8) of the internal gear member 123 is fitted with the outer surface of the one-end wall 114Ab.

Figure 13:
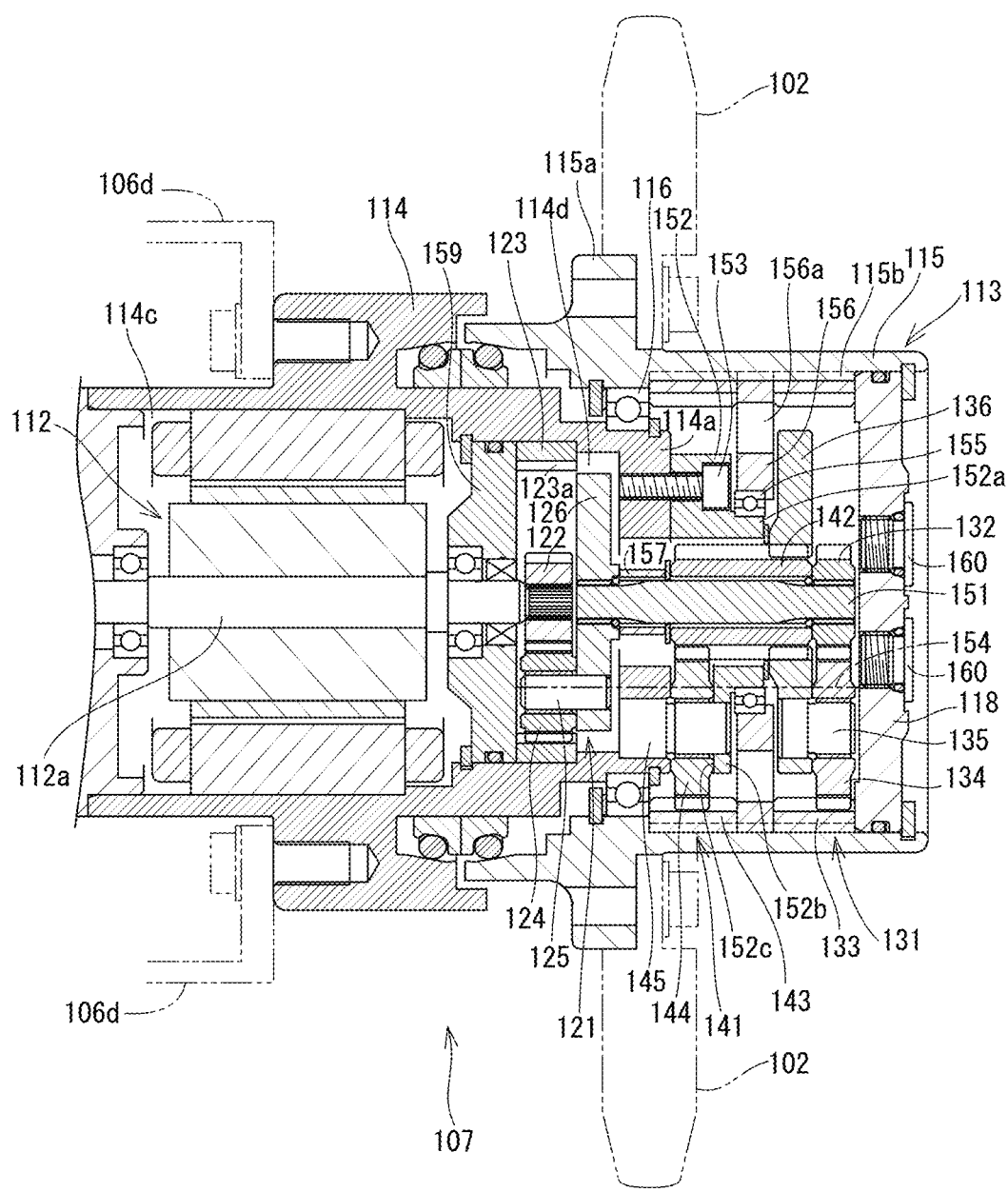
FIG. 13 is a sectional view of a reducer according to an eleventh embodiment.

Next, by referring to FIG. 13, a reducer according to the eleventh embodiment will be described. Like reference numerals designate corresponding or identical elements throughout FIG. 8 and FIG. 13.

In the reducer 113 according to the eleventh embodiment, the fixed housing 114 is a cylindrical integral member that has a motor space 114c and a gear space 114d. In the motor space 114c, the motor 12 is contained. In the gear space 114d, the first-stage planetary gear mechanism 121 is contained. A cover member 159 is located in the fixed housing 114 to partition the motor space 114c and the gear space 114d from each other. It is to be noted that a plurality of oil apertures 114b (see FIG. 9B) are formed through the one-end wall 114a of the fixed housing 114.

The internal gear member 123 of the first-stage planetary gear mechanism 121 is fixed to and unrotatable relative to the inner wall of the fixed housing 114 in the gear space 114d. Also, the sun gear 122-side end of the motor output shaft 112a is rotatably supported by the cover member 159.

The reducer 113 according to the eleventh embodiment is otherwise similar in configuration to the reducer 113 according to the seventh embodiment. Specifically, the reducer 113 according to the eleventh embodiment provides operations and advantageous effects similar to the operations and advantageous effects provided by the reducer 113 according to the seventh embodiment except for the operations and advantageous effects associated with the configuration in which the boss 123b of the internal gear member 123 is fitted with the outer surface of the one-end wall 114Ab (see FIG. 8) and the configuration in which the fixed housing 114 includes the motor housing 114A and the gear housing 114B (see FIG. 8).

As seen from FIG. 8 to FIG. 13, in the reducers 113 according to the seventh to eleventh embodiments, the rotation housing 115 is rotatably supported by the first bearing 116 and the second bearing 155. The first bearing 116 is located on the outer surface of the fixed housing 114. The second bearing 155 is a smaller bearing that is smaller in size than the first bearing 116, and is located on the bearing support member 152. Thus, the plurality of bearings 116 and 155 are used to prevent wobbling of the rotation axis of the rotation housing 115 while reducing the cost of using the plurality of bearings 116 and 155, resulting in a reduction in the production cost of the reducer 113.

Also in the reducers 113 according to the seventh to eleventh embodiments, the planetary gears 144 are located between the one-end wall 114a and the bearing support member 152, and the planetary gear shafts 145 are supported at one ends by the one-end wall 114a and are supported at the other ends by the bearing support member 152. Thus, the one-end wall 114a of the fixed housing 114 and the bearing support member 152, which is located at the one-end wall 114a, are used to firmly fix both ends of each planetary gear shaft 145 without increasing the piece-part count of the reducer 113. Also, the one-end wall 114a, which supports the one end of the planetary gear shaft 145, is integral to the fixed housing 114. This configuration makes it easier to provide rigidity to the fixed housing 114 and reduces the piece-part count of the reducer 113.

Also in the reducers 113 according to the seventh to eleventh embodiments, the gears 122, 123a, and 124 of the first-stage planetary gear mechanism 121 are spiral gears, and the gears 132, 133, 134, 142, 143, and 144 of the second-stage planetary gear mechanism 131 and the third-stage planetary gear mechanism 141 are spur gears. The spiral gears reduce noise and vibration involved in the first-stage planetary gear mechanism 121, which rotates at high rpm, while motive power is highly efficiently transmitted by the spur gears of the second-stage planetary gear mechanism 131 and the third-stage planetary gear mechanism 141, which rotate less rapidly. This configuration realizes high transmission efficiency and a reduction in cost.

Also as seen from FIG. 8 to FIG. 12, in the reducers 113 according to the seventh to tenth embodiments, the first-stage planetary gear mechanism 121 is contained in the gear housing 114B of the fixed housing 114. This configuration reduces the number of planetary gear mechanisms contained in the rotation housing 115, and shortens the length of the rotation housing 115 in the rotation axis direction. As a result, a compact configuration of the reducer 113 is realized. Also, the motor housing 114A and the gear housing 114B are detachable from each other. This configuration improves the machinability of the motor housing 114A and the gear housing 114B. Also, the first-stage planetary gear mechanism 121 can be mounted or removed relative to the reducer 113 with the motor 112 contained in the motor housing 114A. This configuration improves the assemblability and dis-assemblability (maintainability) of the reducer 113.

Figure 14:
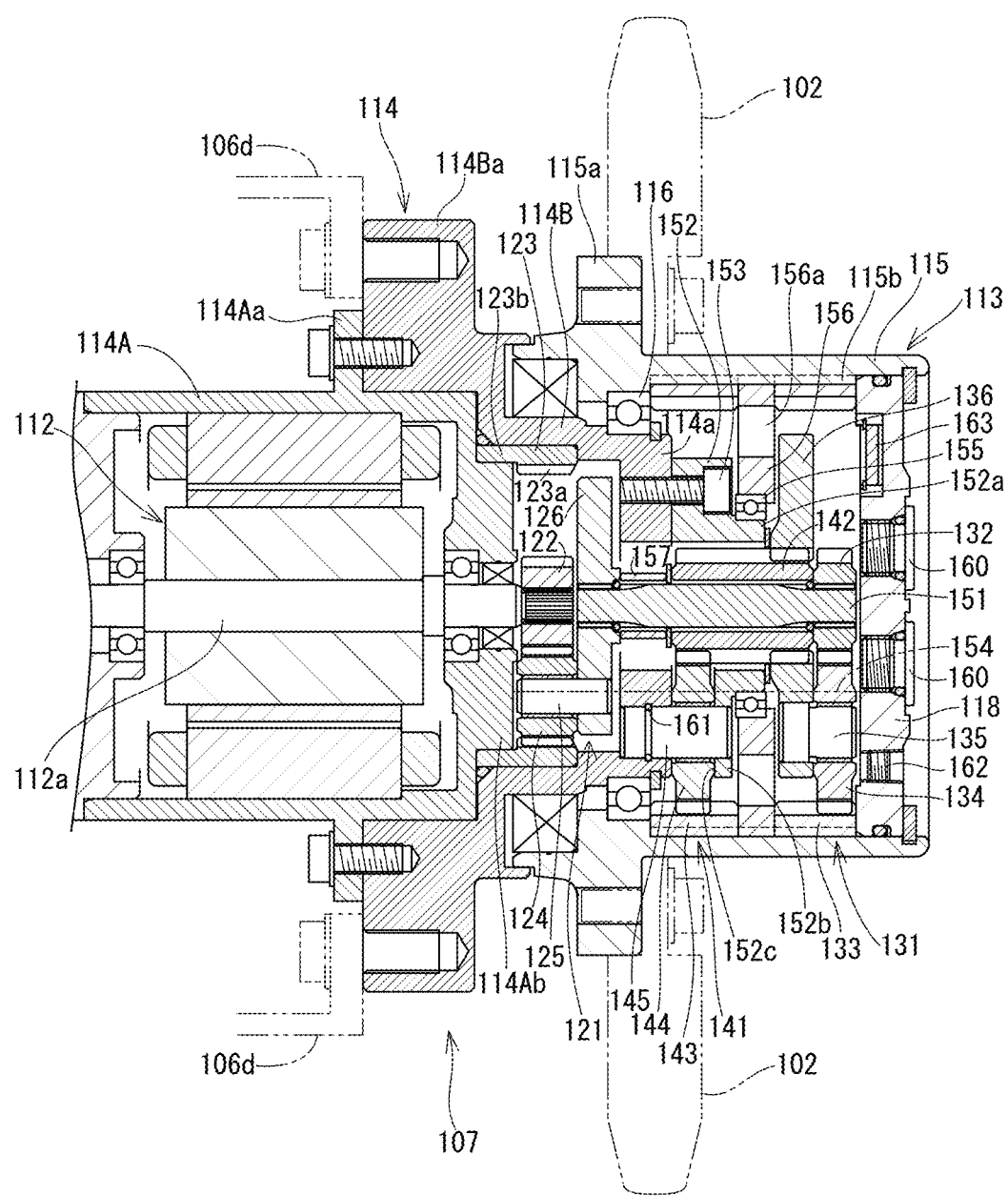
FIG. 14 is a sectional view of a reducer according to a twelfth embodiment.

Next, by referring to FIG. 14, a reducer according to the twelfth embodiment will be described. Like reference numerals designate corresponding or identical elements throughout FIG. 8 and FIG. 14.

In the reducer 113 according to the twelfth embodiment, the planetary gear shafts 145, which are supported at one ends by the one-end wall 14a of the fixed housing 14, are unremovably fixed to the one-end wall 114a. The unremovable configuration is implemented by C-shaped retaining rings 161. Each of the retaining rings 161 is fitted with: a groove formed on the inner wall of a planetary gear shaft attachment hole formed on the one-end wall 114a; and a groove formed on a side surface of the planetary gear shaft 145.

An oil observation inlet is formed through the lid 118 and blocked by a detachable oil observation nut 162. Also, a depression is formed on the lid 118 at a position where the depression is immersed in the lubricant in the rotation housing 115. In the depression, an iron powder removal magnet 163 is located. The iron powder removal magnet 163 attracts and removes ferromagnetic substances, such as iron powder, thereby preventing ferromagnetic substances from contaminating the lubricant in the rotation housing 115.

The reducer 113 according to the twelfth embodiment is otherwise similar in configuration to the reducer 113 according to the seventh embodiment. Specifically, the reducer 13 according to the twelfth embodiment provides operations and advantageous effects similar to the operations and advantageous effects provided by the reducer 113 according to the seventh embodiment.

Obviously, numerous modifications and variations of the present invention are possible in light of the above teachings. It is therefore to be understood that within the scope of the appended claims, the present invention may be practiced otherwise than as specifically described herein.

For example, the multi-stage planetary gear mechanisms provided in the reducers according to the embodiments will not be limited to three-stage planetary gear mechanisms; it is also possible to use two-stage planetary gear mechanisms or four-stage planetary gear mechanisms. Also, the reducers according to the embodiments are applicable to crawler tracks for working vehicles such as agricultural machines and construction machines and for recreational vehicles such as snowmobiles. Also, the reducers according to the embodiments are applicable not only to crawler tracks but also to wheeled tracks. Also, the reducers according to the embodiments are applicable not only to tracks but also to slewing functions in construction machines such as hydraulic shovels and hydraulic cranes.

Also, in the reducers 13 according to the first to sixth embodiments, which have been described by referring to FIG. 1 to FIG. 7, and in the reducers 113 according to the seventh to twelfth embodiments, which have been described by referring to FIG. 8 to FIG. 14, the gears of the first-stage planetary gear mechanism may be spur gears, and the gears of the second-stage and third-stage planetary gear mechanisms may be spiral gears.

Also in the reducers according to the embodiments, any bearings capable of supporting the rotation housing rotatably relative to the fixed housing may be used. Examples of the bearings include, but are not limited to, deep groove ball bearings, angular contact ball bearings, cylindrical roller bearings, and tapered roller bearings.

Also, in the reducers 113 according to the seventh to twelfth embodiments, which have been described by referring to FIG. 8 to FIG. 14, the number of stages of the planetary gear mechanisms may be one. Also, while in the seventh to twelfth embodiments the bearing support member 152 is detachably mounted on the one-end wall 114a of the fixed housing 114, the bearing support member 152 may be integral to the one-end wall 114a, in which case the bearing support member 152 may protrude from the outer surface of the one-end wall 114a.

It is also possible to combine the configurations of the reducer 13 according to of the first to sixth embodiments with the configurations of the reducers 113 according to the seventh to twelfth embodiments.

What is claimed is:
1. A reducer comprising:
a fixed housing containing a motor in the fixed housing;
a rotation housing rotatably supported by the fixed housing via a bearing at an outer surface of a one-end wall of the fixed housing; and
multi-stage planetary gear mechanisms configured to decelerate a rotation of the motor and transmit the rotation that has been decelerated to the rotation housing, the multi-stage planetary gear mechanisms comprising a final-stage planetary gear mechanism located at a downstream position in a direction in which motive power is transmitted, the final-stage planetary gear mechanism comprising a planetary gear rotatably supported by a planetary gear shaft that is only supported at one end of the planetary gear shaft by the one-end wall of the fixed housing such that an opposite end of the planetary gear shaft is not supported by the one-end wall of the fixed housing,
wherein the motor of the fixed housing comprise a motor output shaft,
wherein the multi-stage planetary gear mechanisms comprise a first-stage planetary gear mechanism located at an upstream position in the direction in which the motive power is transmitted, the first-stage planetary gear mechanism comprising a carrier, the carrier of the first-stage planetary gear mechanism is connected to a transmission axis, and the motor output shaft and the transmission axis are coaxially arranged, wherein the fixed housing comprises a motor housing rotatably supporting the motor output shaft of the motor, and a gear housing that is detachably connected to the motor housing and constitutes the one-end wall of the fixed housing.

2. The reducer according to claim 1,
wherein the first-stage planetary gear mechanism comprises spiral gears, and
wherein among the multi-stage planetary gear mechanisms, other multi-stage planetary gear mechanisms than the first-stage planetary gear mechanism comprise spur gears.

3. The reducer according to claim 1,
wherein the rotation housing has an approximately cylindrical shape,
wherein a common internal gear having a width in a direction parallel to a rotation axis of the reducer is integrally formed on an inner surface of the approximately cylindrical shape of the rotation housing, and
wherein the common internal gear is meshed at least with:
the planetary gear of the final-stage planetary gear mechanism; and
a planetary gear of an upper-stage planetary gear mechanism that is among the multi-stage planetary gear mechanisms and that is located at an upper-stream position that is one stage upper than the downstream position of the final-stage planetary gear mechanism in the direction in which the motive power is transmitted.

4. The reducer according to claim 1, wherein the first-stage planetary gear mechanism comprises an internal gear member having an internal gear and a boss, the boss being fitted with an outer surface of the motor housing so that the boss is fixed to the outer surface of the motor housing and unrotatable relative to the outer surface of the motor housing.

5. The reducer according to claim 1, wherein the internal gear member comprises a material having a thermal expansion coefficient smaller than a thermal expansion coefficient of a material of the motor housing.

6. The reducer according to claim 2,
wherein the rotation housing has an approximately cylindrical shape,
wherein a common internal gear having a width in a direction parallel to a rotation axis of the reducer is integrally formed on an inner surface of the approximately cylindrical shape of the rotation housing, and
wherein the common internal gear is meshed at least with:
the planetary gear of the final-stage planetary gear mechanism; and
a planetary gear of an upper-stage planetary gear mechanism that is among the multi-stage planetary gear mechanisms and that is located at an upper-stream position that is one stage upper than the downstream position of the final-stage planetary gear mechanism in the direction in which the motive power is transmitted.

* * * * *